(12) United States Patent
Akl et al.

(10) Patent No.: US 11,876,777 B2
(45) Date of Patent: Jan. 16, 2024

(54) MANAGEMENT OF IDENTIFIERS IN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Karl Georg Hampel, Hoboken, NJ (US); Jianghong Luo, Skillman, NJ (US); Navid Abedini, Somerset, NJ (US); Luca Blessent, Whitehouse Station, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/949,747

(22) Filed: Nov. 12, 2020

(65) Prior Publication Data

US 2021/0152515 A1 May 20, 2021

Related U.S. Application Data

(60) Provisional application No. 62/937,228, filed on Nov. 18, 2019, provisional application No. 62/936,336, filed on Nov. 15, 2019.

(51) Int. Cl.
*H04L 61/5076* (2022.01)
*H04W 36/30* (2009.01)
(Continued)

(52) U.S. Cl.
CPC ....... *H04L 61/5076* (2022.05); *H04W 36/305* (2018.08); *H04W 40/248* (2013.01); *H04W 76/19* (2018.02); *H04W 84/005* (2013.01)

(58) Field of Classification Search
None
See application file for complete search history.

(56) References Cited

U.S. PATENT DOCUMENTS

2021/0099385 A1* 4/2021 Huang ................. H04W 40/02
2021/0227435 A1* 7/2021 Hsieh ................ H04W 36/0055
(Continued)

FOREIGN PATENT DOCUMENTS

EP     3627958 B1 * 1/2022     ............ H04W 16/20

OTHER PUBLICATIONS

"3rd Generation Partnership Project; Technical Specification Group Radio Access Network; NR; Study on Integrated Access and Backhaul; (Release 16)", 3GPP Draft, 38.874, V16.0.0, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, Dec. 2018, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN%5F82/38874%2Dg00%2Ezip, [retrieved on Jan. 11, 2019] Section 9.7, Cited in the Application, Paragraph 6 .1.1 Abstract Section 6.2 IAB Architectures Proposed, p. 13-p. 17 Section 9.7 Topology Adaptation, p. 76-p. 86, 9.2 IAB Topologies, 9.3 Integration of IAB-node, 9.4 Modifications to CU/DU Architecture, 9.4.1 Modifications of IAB- donor/IAB-node, DU and IAB-Donor CU for Architecture Group, 1 72, p. 64-p. 72. Paragraph 7.3.1, paragraph 7.5.

(Continued)

*Primary Examiner* — Kenny S Lin
(74) *Attorney, Agent, or Firm* — QUALCOMM Incorporated

(57) ABSTRACT

Various aspects of the present disclosure generally relate to wireless communication. In some aspects, a central entity in an integrated access and backhaul (IAB) network may (Continued)

determine that a trigger condition for updating transport network layer information of an IAB node in the IAB network is satisfied, based at least in part on at least one of: a change of a donor distributed unit associated with the IAB node, a central entity change associated with the IAB node, or an establishment, release, or modification of a route including the IAB node; and provide, to the IAB node, updated transport network layer information, based at least in part on the trigger condition being satisfied. Numerous other aspects are described.

30 Claims, 16 Drawing Sheets

(51) Int. Cl.
*H04W 40/24* (2009.01)
*H04W 76/19* (2018.01)
*H04W 84/00* (2009.01)

(56) References Cited

U.S. PATENT DOCUMENTS

| | | | | |
|---|---|---|---|---|
| 2021/0315030 | A1* | 10/2021 | Teyeb | H04L 12/4633 |
| 2021/0321281 | A1* | 10/2021 | Wei | H04B 17/336 |
| 2021/0392538 | A1* | 12/2021 | Wang | H04B 7/15528 |
| 2022/0225207 | A1* | 7/2022 | Malkamäki | H04W 8/26 |

OTHER PUBLICATIONS

Huawei: "Integration of IAB Node", 3GPP Draft, R3-192803, 3GPP TSG-RAN WG3 Meeting #104, (TP for NR_IAB BL CR FOR TS 38.401) Integration of IAB-NODE, 3rd Generation Partnership Project (3GPP), Mobile Competence Centre, 650, Route Des Lucioles, F-06921 Sophia-Antipolis, vol. RAN WG3. No. Reno. Nevada, USA, May 13, 2019-May 17, 2019, May 13, 2019 (May 13, 2019), XP051732069, pp. 1-7, Retrieved from the Internet: URL:http://www.3gpp.org/ftp/Meetings%5F3GPP%5FSYNC/RAN3/Docs/R3%2D192803%2Ezip, [retrieved on May 13, 2109] the Whole Document.
International Search Report and Written Opinion—PCT/US2020/070785—ISA/EPO—dated Feb. 19, 2021.
Qualcomm Inc, et al., "IAB Inter-CU Topology Adaptation for Arch 1a", 3GPP TSG-RAN WG3 Meeting #102, 3GPP Draft, R3-186456, Inter-CU Topology Adaptation for Arch11, 3rdGeneration Partnership Project (3GPP), Mobile Competence Centre, 650, Route DesLucioles, F-06921 Sophia-Antipolis Cedex, France, vol. RAN WG3. No. Spokane, WA. USA, Nov. 12, 2018-Nov. 16, 2018, Nov. 2, 2018 (Nov. 2, 2018), 9 Pages, XP051482600, Retrieved from the Internet: URL: http://www.3gpp.org/ftp/tsg%5Fran/WG3%5Flu/TSGR3%5F102/Docs/R3%2D186456%2Ezip, http://www.3gpp.org/ftp/tsg%5Fran/WG3%5Flu/TSGR3%5F102/Docs/R3%2D186456%2Ezip, [retrieved on Nov. 11, 2018] the Whole Document, Figure 2, Paragraph [0002], Figure 9.
Qualcomm Incorporated, et al., "IAB Topology Adaptation for Architecture 1a", 3GPP Draft, R3-184693, 3GPP TSG-RAN WG3 Meeting #101, IAB Topology Adaption for ARCH 1A, 3rd Generation Partnership Project (3GPP), Mobile Competence Centre, 650, Route Des Lucioles, F-06921 Sophia-Antipolis Cedex, France, vol. RAN WG3. No. Gothenburg, Sweden, Aug. 20, 2018-Aug. 24, 2018, Aug. 10, 2018 (Aug. 10, 2018), XP051528040, 13 Pages, Retrieved from the Internet: URL:http://www.3gpp.org/ftp/tsg%5Fran/WG3%5Flu/TSGR3%5F101/Docs/R3%2D184693%2Ezip, [retrieved on Aug. 10, 2018] the Whole Document.
Samsung: "IP Address Management During the IAB Migration", 3GPP Draft, 3GPP TSG-RAN WG3 Meeting #105bis, R3-195001_WASR3-193985_IPMAGNMIGRATION_V0.0, 3rd Generation Partnership Project (3GPP), Mobile Competence Centre, 650, Route Des Lucioles, F-06921 Sophia-Antipolis Cedex , France, vol. RAN WG3. No. Chongqing, China, Oct. 14, 2019-Oct. 18, 2019, Oct. 4, 2019 (Oct. 4, 2019), XP051809598, 5 Pages, Retrieved from the Internet: URL:https://ftp.3gpp.org/tsg_ran/WG3_lu/TSGR3_105bis/Docs/R3-195001.zip, R3-195001_wasR3-193985_IPMagnMigration_v0.0.doc, [retrieved on Oct. 4, 2019] the Whole Document.

* cited by examiner

MANAGEMENT OF IDENTIFIERS IN AN INTEGRATED ACCESS AND BACKHAUL NETWORK

CROSS-REFERENCE TO RELATED APPLICATIONS

This Patent Application claims priority to U.S. Provisional Patent Application No. 62/936,336, filed Nov. 15, 2019, and to U.S. Provisional Patent Application No. 62/937,228, filed on Nov. 18, 2019, both entitled "MANAGEMENT OF IDENTIFIERS IN AN INTEGRATED ACCESS AND BACKHAUL NETWORK," and both assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for management of identifiers in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a central entity in an integrated access and backhaul (IAB) network, may include determining that a trigger condition for updating transport network layer information of an IAB node in the IAB network is satisfied, based at least in part on at least one of: a change of a donor distributed unit associated with the IAB node, a central entity change associated with the IAB node, or an establishment, release, or modification of a route including the IAB node; and providing, to the IAB node, updated transport network layer information, based at least in part on the trigger condition being satisfied.

In some aspects, a method of wireless communication, performed by a central entity in an integrated access and backhaul (IAB) network, may include determining that a trigger condition for updating an identifier of an IAB node of the IAB network is satisfied; and providing, to the IAB node, an updated identifier, based at least in part on determining that the trigger condition is satisfied.

In some aspects, a method of wireless communication, performed by a central entity in an integrated access and backhaul (IAB) network, may include determining that a trigger condition for updating one or more cell identifiers of an IAB node of the IAB network is satisfied, wherein the one or more updated cell identifiers correspond to one or more cells served by the IAB node; and providing, to the IAB node, one or more updated cell identifiers, based at least in part on determining that the trigger condition is satisfied.

In some aspects, a method of wireless communication, performed by an integrated access and backhaul (IAB) node in an IAB network, may include receiving updated transport network layer information, based at least in part on a trigger condition for updating transport network layer information being satisfied, wherein the trigger condition is based at least in part on at least one of: a change of a donor distributed unit associated with the IAB node, a central entity change associated with the IAB node, or an establishment, release, or modification of a route including the IAB node; and performing a communication using the updated transport network layer information.

In some aspects, a method of wireless communication, performed by an integrated access and backhaul (IAB) node in an IAB network, may include receiving an updated identifier of the IAB node, based at least in part on a trigger condition for updating an identifier of the IAB node of the IAB network being satisfied; and performing a communication using the updated identifier.

In some aspects, a method of wireless communication, performed by an integrated access and backhaul (IAB) node in an IAB network, may include receiving one or more updated cell identifiers of the IAB node, based at least in part on a trigger condition being satisfied, wherein the one or more updated cell identifiers correspond to one or more cells served by the IAB node; and performing a communication using the one or more updated cell identifiers.

In some aspects, a central entity of an IAB network may include memory and one or more processors operatively coupled to the memory. The memory and the one or more processors may be configured to determine that a trigger condition for updating transport network layer information of an IAB node in the IAB network is satisfied, based at least in part on at least one of: a change of a donor distributed unit associated with the IAB node, a central entity change associated with the IAB node, or an establishment, release, or modification of a route including the IAB node; and provide, to the IAB node, updated transport network layer information, based at least in part on the trigger condition being satisfied.

In some aspects, a central entity of an IAB network may include memory and one or more processors operatively coupled to the memory. The memory and the one or more processors may be configured to determine that a trigger condition for updating one or more cell identifiers of an IAB node of the IAB network is satisfied, wherein the one or more updated cell identifiers correspond to one or more cells served by the IAB node; and provide, to the IAB node, one or more updated cell identifiers, based at least in part on determining that the trigger condition is satisfied.

In some aspects, an IAB node of an IAB network may include memory and one or more processors operatively coupled to the memory. The memory and the one or more processors may be configured to receive updated transport network layer information, based at least in part on a trigger condition for updating transport network layer information being satisfied, wherein the trigger condition is based at least in part on at least one of: a change of a donor distributed unit associated with the IAB node, a central entity change associated with the IAB node, or an establishment, release, or modification of a route including the IAB node; and perform a communication using the updated transport network layer information.

In some aspects, an IAB node of an IAB network may include memory and one or more processors operatively coupled to the memory. The memory and the one or more processors may be configured to receive an updated identifier of the IAB node, based at least in part on a trigger condition for updating an identifier of the IAB node of the IAB network being satisfied; and perform a communication using the updated identifier.

In some aspects, an IAB node of an IAB network may include memory and one or more processors operatively coupled to the memory. The memory and the one or more processors may be configured to receive one or more updated cell identifiers of the IAB node, based at least in part on a trigger condition being satisfied, wherein the one or more updated cell identifiers correspond to one or more cells served by the IAB node; and perform a communication using the one or more updated cell identifiers.

In some aspects, a non-transitory computer-readable medium may store one or more instructions for wireless communication. The one or more instructions, when executed by one or more processors of a central entity of an IAB network, may cause the one or more processors to: determine that a trigger condition for updating transport network layer information of an IAB node in the IAB network is satisfied, based at least in part on at least one of: a change of a donor distributed unit associated with the IAB node, a central entity change associated with the IAB node, or an establishment, release, or modification of a route including the IAB node; and provide, to the IAB node, updated transport network layer information, based at least in part on the trigger condition being satisfied.

In some aspects, a non-transitory computer-readable medium may store one or more instructions for wireless communication. The one or more instructions, when executed by one or more processors of a central entity of an IAB network, may cause the one or more processors to: determine that a trigger condition for updating an identifier of an IAB node of the IAB network is satisfied; and provide, to the IAB node, an updated identifier, based at least in part on determining that the trigger condition is satisfied.

In some aspects, a non-transitory computer-readable medium may store one or more instructions for wireless communication. The one or more instructions, when executed by one or more processors of a central entity of an IAB network, may cause the one or more processors to: determine that a trigger condition for updating one or more cell identifiers of an IAB node of the IAB network is satisfied, wherein the one or more updated cell identifiers correspond to one or more cells served by the IAB node; and provide, to the IAB node, one or more updated cell identifiers, based at least in part on determining that the trigger condition is satisfied.

In some aspects, a non-transitory computer-readable medium may store one or more instructions for wireless communication. The one or more instructions, when executed by one or more processors of an IAB node of an IAB network, may cause the one or more processors to: receive updated transport network layer information, based at least in part on a trigger condition for updating transport network layer information being satisfied, wherein the trigger condition is based at least in part on at least one of: a change of a donor distributed unit associated with the IAB node, a central entity change associated with the IAB node, or an establishment, release, or modification of a route including the IAB node; and perform a communication using the updated transport network layer information.

In some aspects, a non-transitory computer-readable medium may store one or more instructions for wireless communication. The one or more instructions, when executed by one or more processors of an IAB node of an IAB network, may cause the one or more processors to: receive an updated identifier of the IAB node, based at least in part on a trigger condition for updating an identifier of the IAB node of the IAB network being satisfied; and perform a communication using the updated identifier.

In some aspects, a non-transitory computer-readable medium may store one or more instructions for wireless communication. The one or more instructions, when executed by one or more processors of an IAB node of an IAB network, may cause the one or more processors to: receive one or more updated cell identifiers of the IAB node, based at least in part on a trigger condition being satisfied, wherein the one or more updated cell identifiers correspond to one or more cells served by the IAB node; and perform a communication using the one or more updated cell identifiers.

In some aspects, an apparatus for wireless communication may include means for determining that a trigger condition for updating transport network layer information of an integrated access and backhaul (IAB) node in an IAB network is satisfied, based at least in part on at least one of: a change of a donor distributed unit associated with the IAB node, a central entity change associated with the IAB node, or an establishment, release, or modification of a route including the IAB node; and means for providing, to the IAB node, updated transport network layer information, based at least in part on the trigger condition being satisfied.

In some aspects, an apparatus for wireless communication may include means for determining that a trigger condition for updating an identifier of an integrated access and backhaul (IAB) node in an IAB network is satisfied; and means for providing, to the IAB node, an updated identifier, based at least in part on determining that the trigger condition is satisfied.

In some aspects, an apparatus for wireless communication may include means for determining that a trigger condition for updating one or more cell identifiers of an integrated access and backhaul (IAB) node in an IAB network is satisfied, wherein the one or more updated cell identifiers correspond to one or more cells served by the IAB node; and means for providing, to the IAB node, one or more updated cell identifiers, based at least in part on determining that the trigger condition is satisfied.

In some aspects, an apparatus for wireless communication may include means for receiving updated transport network layer information, based at least in part on a trigger condition for updating transport network layer information being satisfied, wherein the trigger condition is based at least in part on at least one of: a change of a donor distributed unit associated with an integrated access and backhaul (IAB) node in an IAB network, a central entity change associated with the IAB node, or an establishment, release, or modification of a route including the IAB node; and means for performing a communication using the updated transport network layer information.

In some aspects, an apparatus for wireless communication may include means for receiving an updated identifier of an integrated access and backhaul (IAB) node in an IAB network, based at least in part on a trigger condition for updating an identifier of the IAB node of the IAB network being satisfied; and means for performing a communication using the updated identifier.

In some aspects, an apparatus for wireless communication may include means for receiving one or more updated cell identifiers of an integrated access and backhaul (IAB) node in an IAB network, based at least in part on a trigger condition being satisfied, wherein the one or more updated cell identifiers correspond to one or more cells served by the IAB node; and means for performing a communication using the one or more updated cell identifiers.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
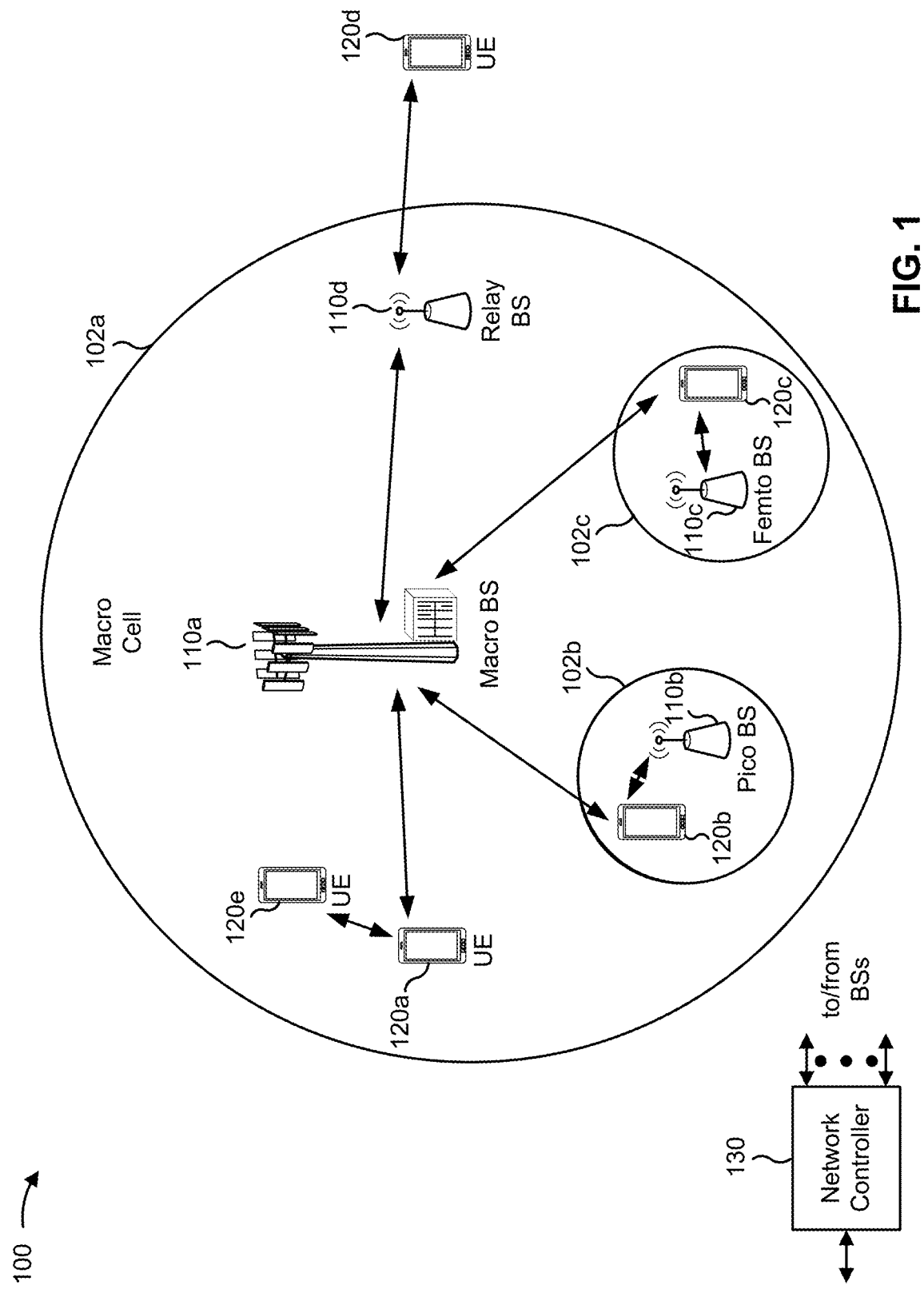
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay station may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
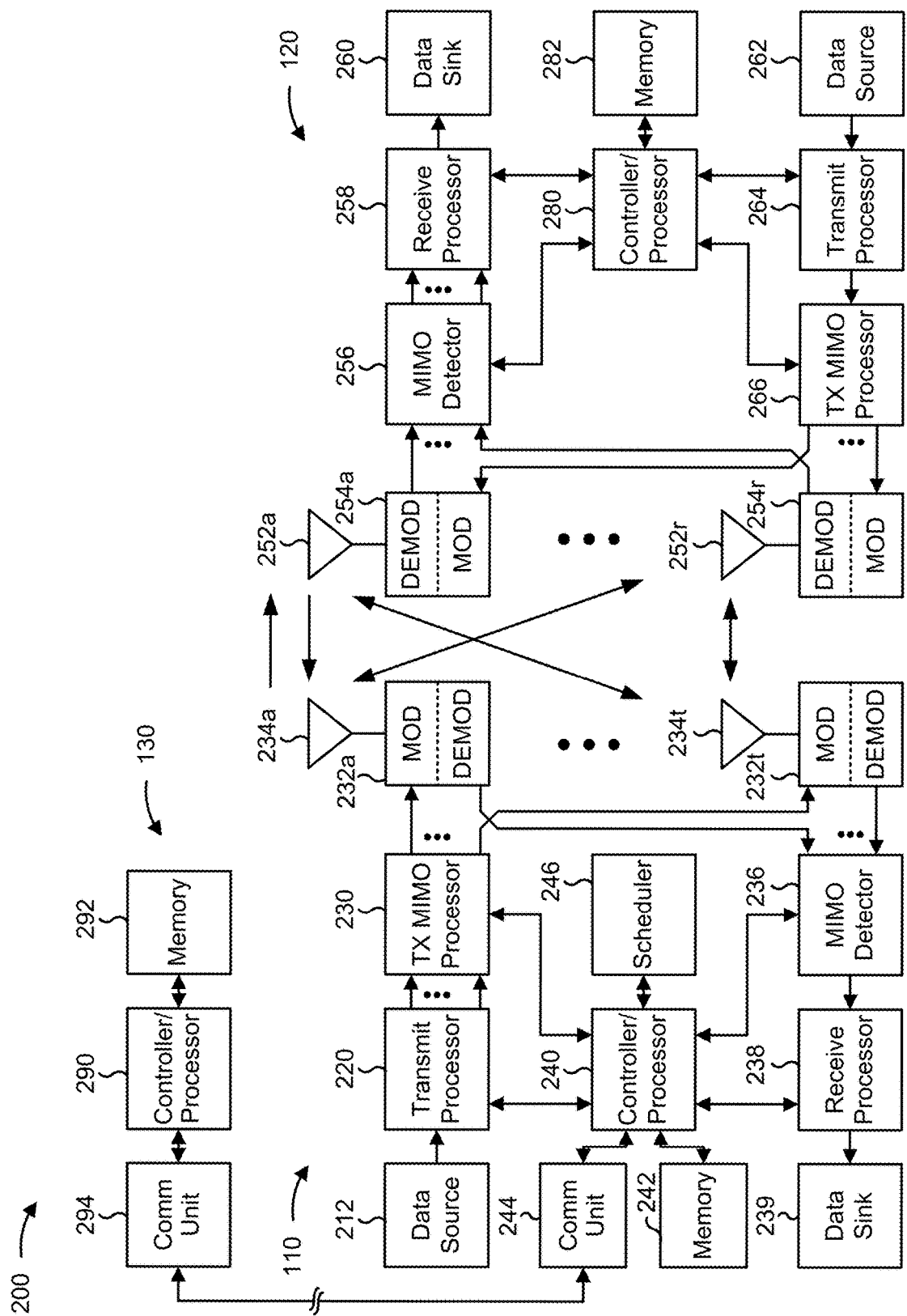
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with updating one or more identifiers in an IAB network, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1100 of FIG. 11, process 1200 of FIG. 12, process 1300 of FIG. 13, process 1400 of FIG. 14, process 1500 of FIG. 15, process 1600 of FIG. 16, and/or other processes as described herein. A scheduler 246 may schedule UEs for data transmission on the downlink and/or uplink.

In some aspects, BS 110 (e.g., a central entity associated with BS 110) may include means for determining that a trigger condition for updating transport network layer information of an IAB node in the IAB network is satisfied, based at least in part on at least one of: a change of a donor distributed unit associated with the IAB node, a change of a central entity associated with the IAB node, or an establishment, release, or modification of a route including the IAB node; means for providing, to the IAB node, updated transport network layer information, based at least in part on the trigger condition being satisfied; means for providing, to the second central entity, a context for a mobile terminal of the IAB node and an indication that the IAB node is associated with a distributed unit; means for determining whether the transport network layer information is to be updated based at least in part on the trigger condition; means for determining that a trigger condition for updating an identifier of an IAB node of the IAB network is satisfied; means for providing, to the IAB node, an updated identifier, based at least in part on determining that the trigger condition is satisfied; means for providing, to the second central entity, a context for a mobile terminal of the IAB node and an indication that the IAB node is associated with a distributed unit; means for determining whether the identifier of the IAB node is to be updated based at least in part on the trigger condition; means for determining that a trigger condition for updating one or more cell identifiers of an IAB node of the IAB network is satisfied, wherein the one or more updated cell identifiers correspond to one or more cells served by the IAB node; means for providing, to the IAB node, one or more updated cell identifiers, based at least in part on determining that the trigger condition is satisfied; means for providing, to the second central entity, a context for a mobile terminal of the IAB node and an indication that the IAB node is associated with a distributed unit; means for determining whether the one or more cell identifiers are to be updated based at least in part on the trigger condition; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 (e.g., an IAB node associated with BS 110) may include means for receiving updated transport network layer information, based at least in part on a trigger condition for updating transport network layer information being satisfied; means for performing a communication using the updated transport network layer information; means for receiving a request for a network address; means for providing the network address, wherein the updated transport network layer information is based at least in part on the network address; means for providing, to a central entity, an indication regarding the establishment, release, or modification of the route, wherein the trigger condition is based at least in part on the indication; means for receiving an updated identifier of the IAB node, based at least in part on a trigger condition for updating an identifier of the IAB node of the IAB network being satisfied; means for performing a communication using the updated identifier; means for providing, to a central entity, an indication regarding an establishment, release, or modification of a route including the IAB node, wherein the trigger condition is based at least in part on the indication; means for receiving one or more updated cell identifiers of the IAB node, based at least in part on a trigger condition being satisfied, wherein the one or more updated cell identifiers correspond to one or more cells served by the IAB node; means for performing a communication using the one or more updated cell identifiers; means for providing, to a central entity, an indication regarding an establishment, release, or modification of a route including the IAB node, wherein the trigger condition is based at least in part on the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
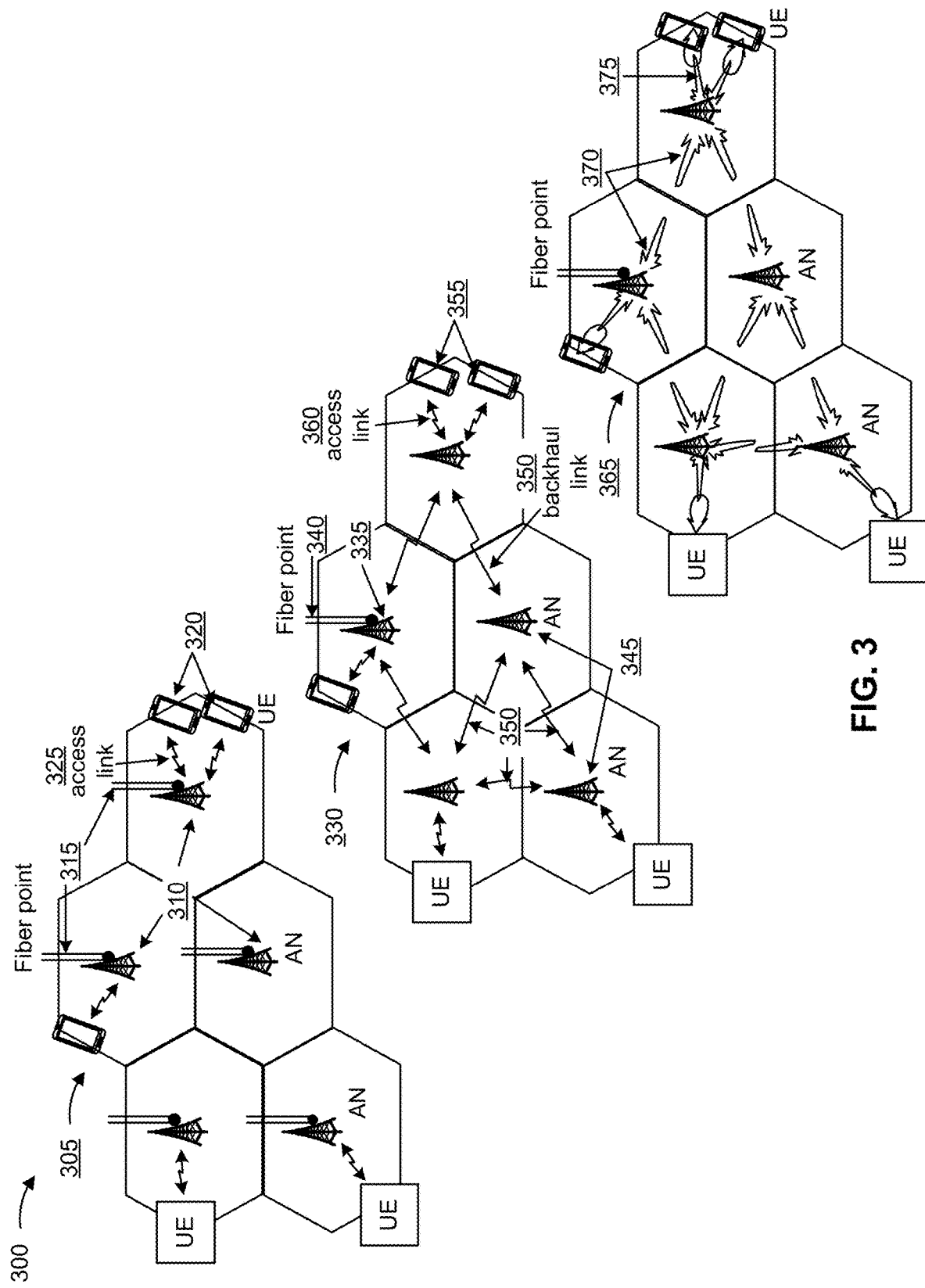
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations, IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
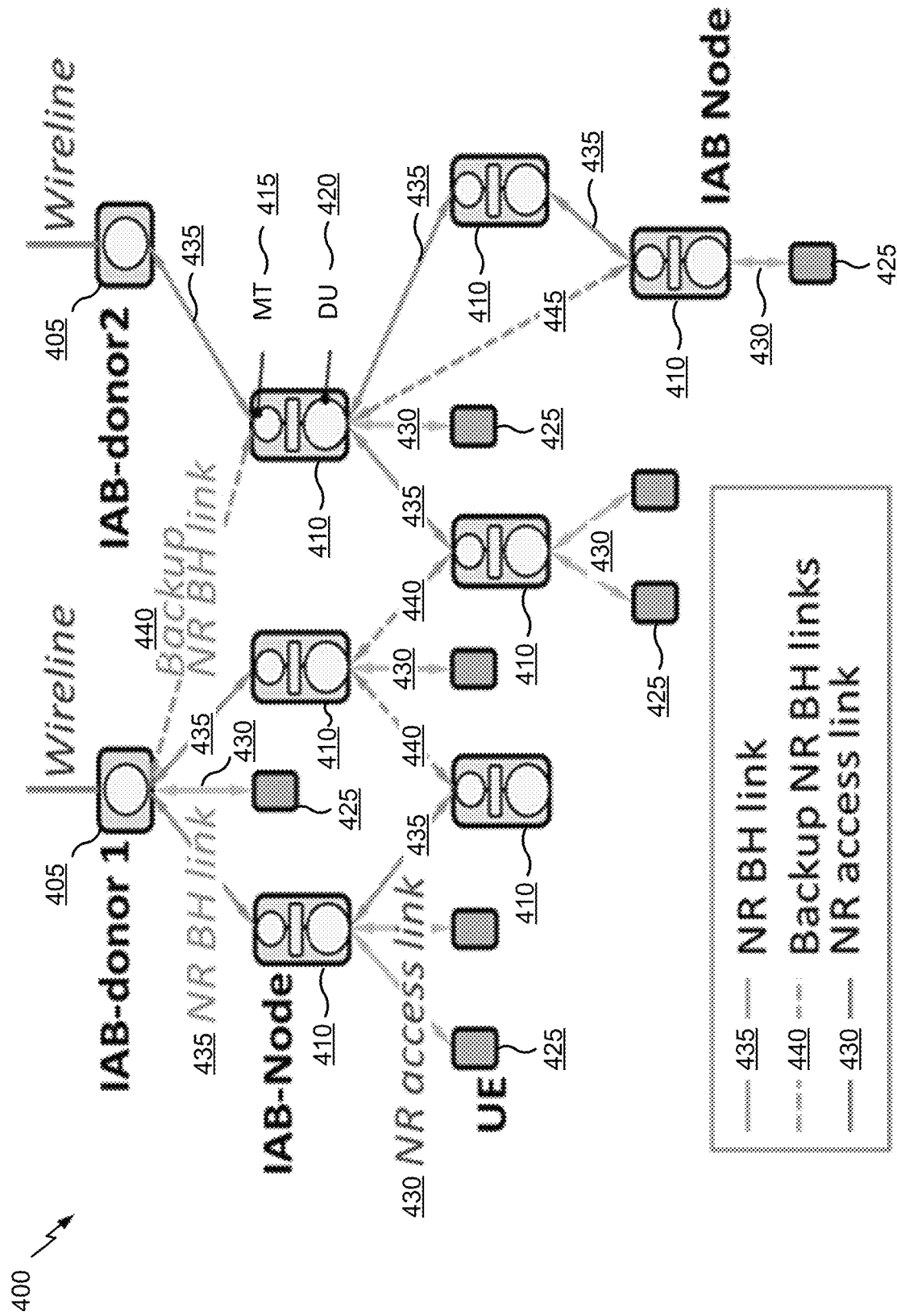
FIG. 4 is a diagram illustrating an example of an integrated access and backhaul (IAB) network architecture, in accordance with various aspects of the disclosure.

FIG. 4 is a diagram illustrating an example 400 of an integrated access and backhaul (IAB) network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (e.g., access management function (AMF)). In some aspects, an anchor node 405 may include a base station 110, such as an anchor base station, as described above in connection with FIG. 3.

As further shown in FIG. 4, the IAB network may include non-anchor nodes 410, or IAB nodes (shown as IAB-Node). A non-anchor node 410 may provide integrated access and backhaul functionality, and may include mobile terminal (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 445 may be used if a primary backhaul link fails, becomes congested, becomes overloaded, and/or the like.

As indicated above, FIG. 4 is provided as an example. Other examples may differ from what is described with regard to FIG. 4.

Figure 5:
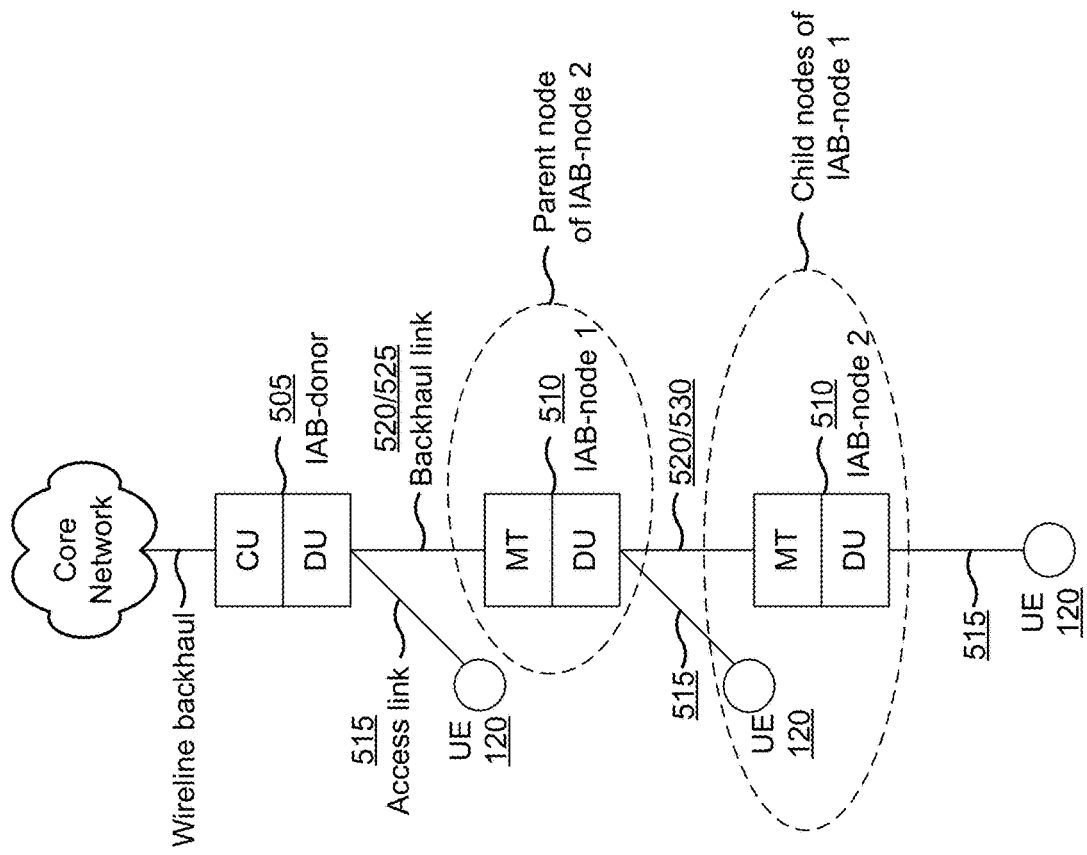
FIG. 5 is a diagram illustrating another example of an IAB network architecture, in accordance with various aspects of the present disclosure.

FIG. 5 is a diagram illustrating an example 500 of an IAB network architecture, in accordance with various aspects of the disclosure.

As shown in FIG. 5, an IAB network may include an IAB donor 505 (shown as IAB-donor) that connects to a core network via a wired connection (shown as a wireline backhaul). For example, an Ng interface of an IAB donor 505 may terminate at a core network. Additionally, or alternatively, an IAB donor 505 may connect to one or more devices of the core network that provide a core access and mobility management function (e.g., AMF). In some aspects, an IAB donor 505 may include a base station 110, such as an anchor base station, as described above in connection with FIG. 3. As shown, an IAB donor 505 may be include a central unit (CU), which may perform access node controller (ANC) functions, AMF functions, and/or the like. The CU may configure a distributed unit (DU) of the IAB donor 505 and/or may configure one or more IAB nodes 510 (e.g., an MT and/or a DU of an IAB node 510) that connect to the core network via the IAB donor 505. Thus, a CU of an IAB donor 505 may control and/or configure the entire IAB network that connects to the core network via the IAB donor 505, such as by using control messages and/or configuration messages (e.g., a radio resource control (RRC) configuration message and/or the like).

As further shown in FIG. 5, the IAB network may include IAB nodes 510 (shown as IAB-node 1 and IAB-node 2) that connect to the core network via the IAB donor 505. As shown, an IAB node 510 may include mobile termination (MT) functions (sometimes referred to as UE functions (UEF)) and may include DU functions (sometimes referred to as access node functions (ANF)). The MT functions of an IAB node 510 (e.g., a child node) may be controlled and/or scheduled by another IAB node 510 (e.g., a parent node of the child node) and/or by an IAB donor 505. The DU functions of an IAB node 510 (e.g., a parent node) may control and/or schedule other IAB nodes 510 (e.g., child nodes of the parent node) and/or UEs 120. Thus, a DU may be referred to as a scheduling node or a scheduling component, and an MT may be referred to as a scheduled node or a scheduled component. In some aspects, an IAB donor 505 may include DU functions and not MT functions. That is, an IAB donor 505 may configure, control, and/or schedule communications of IAB nodes 510 and/or UEs 120. In some aspects, a UE 120 may include only MT functions, and not DU functions. That is, communications of a UE 120 may be controlled and/or scheduled by an IAB donor 505 and/or an IAB node 510 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 505 or an IAB node 510, and a child node may be an IAB node 510 or a UE 120. Communications of an MT function of a child node may be controlled and/or scheduled by a parent node of the child node.

FIG. 5 also shows an access link 515 between a UE 120 (e.g., which only has MT functions, and not DU functions)

and an IAB donor 505, or between a UE 120 and an IAB node 510. Access link 515 may be a wireless access link that provides a UE 120 with radio access to a core network via an IAB donor 505, and optionally via one or more IAB nodes 510. The network illustrated in FIG. 5 may be referred to as a multi-hop network since some UEs 120 have radio access to the core network via two or more devices (e.g., an IAB donor 505 and one or more IAB nodes 510).

As further shown in FIG. 5, a link between an IAB donor 505 and an IAB node 510 or between two IAB nodes 510 may be referred to as a backhaul link 520. Backhaul link 520 may be a wireless backhaul link that provides an IAB node 510 with radio access to a core network via an IAB donor 505, and optionally via one or more other IAB nodes 510. In some aspects, a backhaul link 520 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, a node or a wireless node may refer to an IAB donor 505 or an IAB node 510.

A control interface connection, such as an F1-connection (F1-C) may be established between an IAB donor CU and each of the IAB donor DUs and IAB node DUs associated with the IAB donor CU. An F1-application protocol (AP) or stream control transmission protocol (SCTP) connection may be used to exchange control plane (CP) messages between the IAB donor CU, the IAB node DUs, and/or the IAB donor DUs. Each IAB donor DU and IAB node DU within a base station may be configured with a gNB-DU identifier. The gNB-DU identifier may be is used within F1-AP procedures. An IAB donor DU or IAB node DU may provide the gNB-DU identifier to the IAB donor CU during an F1-setup procedure. The gNB-DU identifier may uniquely identify an IAB donor DU or IAB node DU at the IAB donor CU. Furthermore, a CU may include a CU-control plane (CU-CP) and a CU-user plane (CU-UP), which may handle control plane functions and user plane functions, respectively.

As indicated above, FIG. 5 is provided as an example. Other examples may differ from what is described with regard to FIG. 5.

In some instances, the topology of an IAB network may change. As one example, a route for an IAB node may switch from one parent node of the IAB node to another parent node of the IAB node. As another example, a route for an IAB node may switch from a first parent node associated with a first IAB donor and CU to a second parent node associated with a second IAB donor and CU. In these cases, various identifiers associated with the IAB node may become outdated. For example, a transport network layer identifier (e.g., an Internet Protocol (IP) address and/or the like), an identifier of the IAB node, a cell identifier of a cell, and/or the like, may become outdated when the topology associated with the IAB node changes.

It may be beneficial to update one or more identifiers associated with the IAB node. However, some techniques for updating or assigning the one or more identifiers, such as pre-configuration or configuration at integration of an IAB node, may introduce latency and service interruption. This may be particularly problematic in IAB networks where topology can change frequently, for example, due to changes in channel conditions, changes in identities of IAB nodes, changes in locations of IAB nodes, and so on.

Some techniques and apparatuses described herein provide dynamic configuration of updated identifiers, such as transport network layer information, an IAB node DU identifier, and/or a cell identifier, of an IAB node based at least in part on various changes in an IAB network. For example, this dynamic configuration may be performed based at least in part on a trigger condition, such as redirecting an existing interface association or tunnel onto a new route, establishing a new interface association or tunnel, integrating an IAB node, radio link failure, handover, topology adaptation, and/or the like. Further, some techniques and apparatuses described herein provide implementation of an updated identifier by an IAB node (e.g., a DU of the IAB node). In this way, latency and service interruption associated with the updating of identifiers due to a topology change in an IAB network may be reduced, thereby increasing throughput and conserving computing resources.

Figure 6:
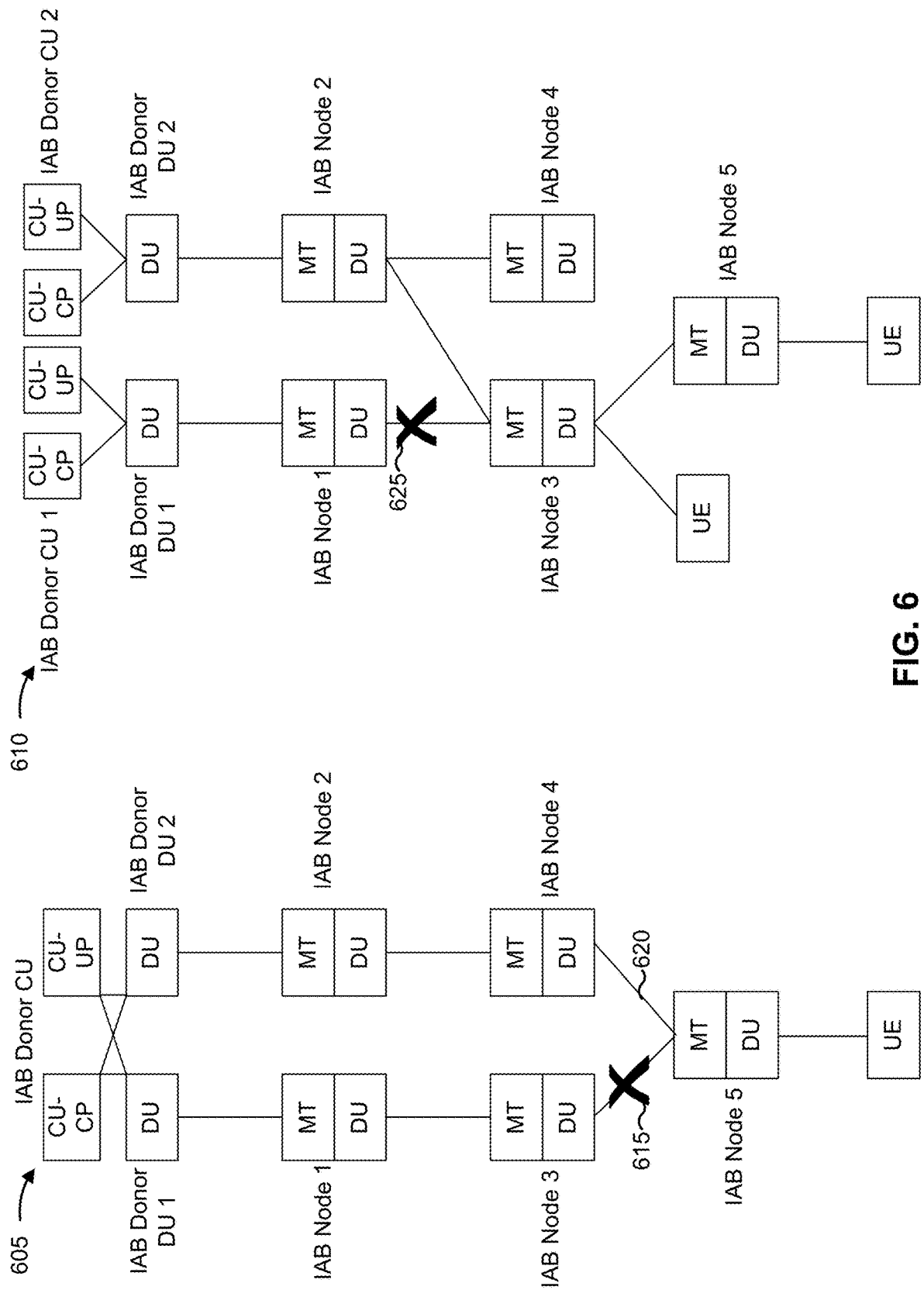
FIG. 6 is a diagram illustrating examples of trigger conditions for updating one or more identifiers of an IAB network, in accordance with various aspects of the present disclosure.

FIG. 6 is a diagram illustrating examples 605 and 610 of trigger conditions for updating one or more identifiers of an IAB network, in accordance with various aspects of the present disclosure. Example 605 is an example of an IAB donor DU intra-CU change. In example 605, as shown by reference number 615, a parent node of IAB Node 5 may change from IAB Node 3 to IAB Node 4. The connection with IAB Node 4 is shown by reference number 620. As further shown, IAB Nodes 3 and 4 are associated with different IAB donor DUs and a same CU (shown as a same CU-control plane (CP) and a same CU-user plane (UP)). In this case, the CU may update transport network layer (TNL) information to redirect F1-U tunnels and the F1-AP interface onto a new route corresponding to IAB donor DU 2. Thus, the IAB donor DU intra-CU change may be a trigger condition for the techniques described herein.

Example 610 is an example of an IAB donor DU inter-CU change. In example 610, as shown by reference number 625, a parent node of IAB Node 3 may change from IAB Node 1 to IAB Node 2. As further shown, IAB Nodes 1 and 2 are associated with different IAB Donor CUs. In this case, transport network layer addresses for IAB Node 3's DU and IAB Node 5's DU may be updated to establish F1-AP associations and F1-U tunnels for the updated route through IAB Node 2. Furthermore, a gNB-DU ID for IAB Node 3's DU and IAB Node 5's DU may need to be unique at IAB Donor CU 2, and thus may or may not be updated. Still further, the NR cell global identities (NCGIs) of cells served by IAB Node 3's DU and IAB Node 5's DU may be configured with cell identifiers corresponding to IAB Donor CU 2. Thus, the IAB donor DU inter-CU change may be a trigger condition for the techniques described herein.

FIGS. 7-10 are diagrams illustrating examples 700, 800, 900, and 1000 of updating one or more identifiers of an IAB network, in accordance with various aspects of the present disclosure.

Figure 7:
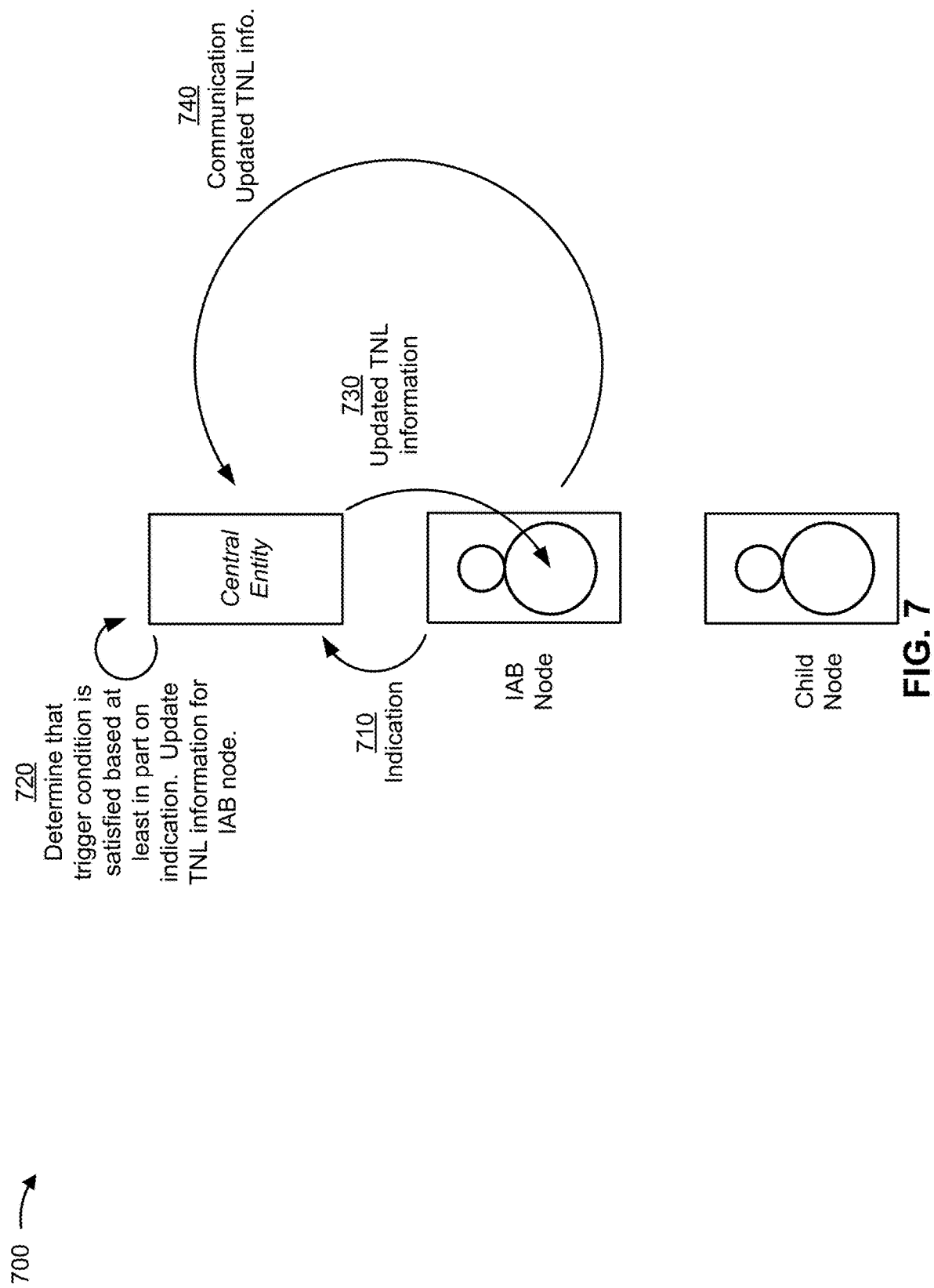
FIGS. 7-10 are diagrams illustrating examples of updating one or more identifiers of an IAB network, in accordance with various aspects of the present disclosure.

Example 700, shown in FIG. 7, is an example of updating transport network layer (TNL) information based at least in part on determining that a trigger condition is satisfied. As shown, example 700 includes a central entity (e.g., a CU and/or the like), an IAB node, and a child node. The IAB node and the child node include respective MTs (indicated by the smaller circles) and DUs (indicated by the larger circles). In some aspects, the IAB node may be associated with a parent node, such as another IAB node upstream from the IAB node between the IAB donor and the IAB node.

In some aspects, the trigger condition may relate to a change of a donor DU associated with the IAB node, such as in example 605, for example, due to a radio link failure on a link to the donor DU. In some aspects, the trigger condition may relate to a change of a donor CU associated with the IAB node, such as in example 610.

In some aspects, the trigger condition may relate to an establishment, release, or modification of a route including the IAB node. As a first example, the trigger condition may relate to integration of an IAB node. As a second example, the trigger condition may relate to radio link failure (RLF) on a link to a parent DU (e.g., an IAB node DU or an IAB donor DU) of the IAB node or an upstream IAB node, a link to a master cell group of the IAB node or an upstream IAB node, or a link to a secondary cell group of the IAB node or an upstream IAB node. As a third example, the trigger condition may relate to a handover, a secondary node addition (e.g., a secondary node associated with a dual connectivity configuration or a non-standalone (NSA) mode), an inter-master-node handover (e.g., with or without secondary node change), a secondary node change, a master node/secondary node role switch (e.g., a master node associated with a dual connectivity configuration or an NSA mode), a master node or secondary node modification (e.g., moving bearers for load balancing) and/or the like, for an IAB node or a node upstream from the IAB node. As a fourth example, the trigger condition may relate to a topology adaptation involving the addition, release, or modification of an IP route or a backhaul adaptation protocol (BAP) route. The addition of a new route may be for topology redundancy, for signaling transport, data transport, or a combination thereof.

As shown by reference number 710, the IAB node may provide an indication to the central entity. This indication may be provided by an MT of the IAB node or a DU of the IAB node. Various examples of the indication are provided below.

In some aspects, the indication may relate to an RRC connection establishment procedure. For example, upon integration of the IAB node into an IAB network, the IAB node's MT may initiate an RRC connection establishment procedure in which the IAB node indicates to the central entity that the IAB node has a collocated DU.

In some aspects, the indication may relate to RLF. For example, after an RLF on a parent link, an IAB node's MT may initiate an RRC connection re-establishment procedure in which the MT indicates to the central entity that the MT has a collocated DU. The IAB node's MT may also indicate that the IAB node DU was previously activated. In some aspects, the IAB node's MT may provide a list of previously served and/or activated cells at the collocated DU. In some aspects, the IAB node's MT may provide context for served children (e.g., UEs and/or child IAB nodes) of the previously activated IAB node DU. In this case, in some aspects, the central entity towards which the RRC connection re-establishment procedure is initiated may request context regarding the IAB node (e.g., the MT and/or the DU) and a served subtree below the IAB node from a previous central entity of the IAB node or an access management function (AMF) of the IAB node (if such entities can be identified).

In some aspects, upon initiation of establishment of an F1-C association towards an IAB donor central entity, an IAB node DU may indicate, to the central entity, that the IAB node DU was previously activated. In this case, the IAB node DU may provide a list of served and activated cells associated with the IAB node DU.

As shown by reference number 720, the central entity may determine that the trigger condition is satisfied. For example, the central entity may determine whether the TNL information is to be updated. In example 700, the central entity determines that the trigger condition is satisfied (e.g., that the TNL information is to be updated) based at least in part on an indication received from the IAB node. In some aspects, the central entity may determine that the trigger condition is satisfied independently of the indication or without having received the indication. As further shown, the central entity may update TNL information for the IAB node. For example, as shown by reference number 730, the central entity may provide updated TNL information for the IAB node to the IAB node and/or one or more other nodes associated with the IAB node. For example, the central entity may provide the updated TNL information in an RRC message, an F1-AP message, and/or the like.

The TNL information may identify an IP address (e.g., an IPv4 address or an IPv6 address), multiple IP addresses, or an aggregation of IP addresses (e.g., an IP prefix). In some aspects, the TNL information may be the same for signaling services (e.g., F1-C traffic) and data transport (e.g., F1-U traffic). In some aspects, the TNL information may be different for signaling services than for data transport. For example, TNL information for an F1 control plane (F1-C) interface, an F1 application protocol (F1-AP), and SCTP associations may be the same as or may be different than TNL information for an F1 user plane (F1-U) and a general packet radio service (GPRS) tunneling protocol (GTP) user plane (GTP-U) tunnel. In some aspects, the TNL information may be the same for non-UE-associated services (e.g., non-F1 traffic) and for UE-associated services. In some aspects, the TNL information may be different for non-UE associated services than for UE-associated services.

In some aspects, the updated TNL information may be based at least in part on an association with an IAB donor DU on a newly established or redirected route between the IAB node's DU and the central entity (e.g., the CU-CP or CU-UP). As one example, the IAB donor DU may be associated with an IP prefix. The IP addresses of the IAB node DU may be derived from this IP prefix. The central entity may request one or more IP addresses from the IAB donor DU, and may provide a configuration message to the IAB node's DU based at least in part on the one or more IP addresses provided by the IAB donor DU. Similarly, if F1-AP associations or F1-U tunnels are to be turned down or redirected from an IAB donor DU, the central entity may transmit, to the IAB node, a configuration message indicating to release one or more IP addresses. The central entity may indicate the release of an IP address to an IAB donor DU.

As shown by reference number 740, the IAB node may perform a communication (e.g., via the IP layer) using the updated TNL information. For example, the IAB node may indicate the updated TNL information in an issued packet after the corresponding TNL association becomes operational. Here, the communication is performed with the IAB donor DU, though the communication can be performed with any IAB node, UE, or IAB donor.

Figure 8:
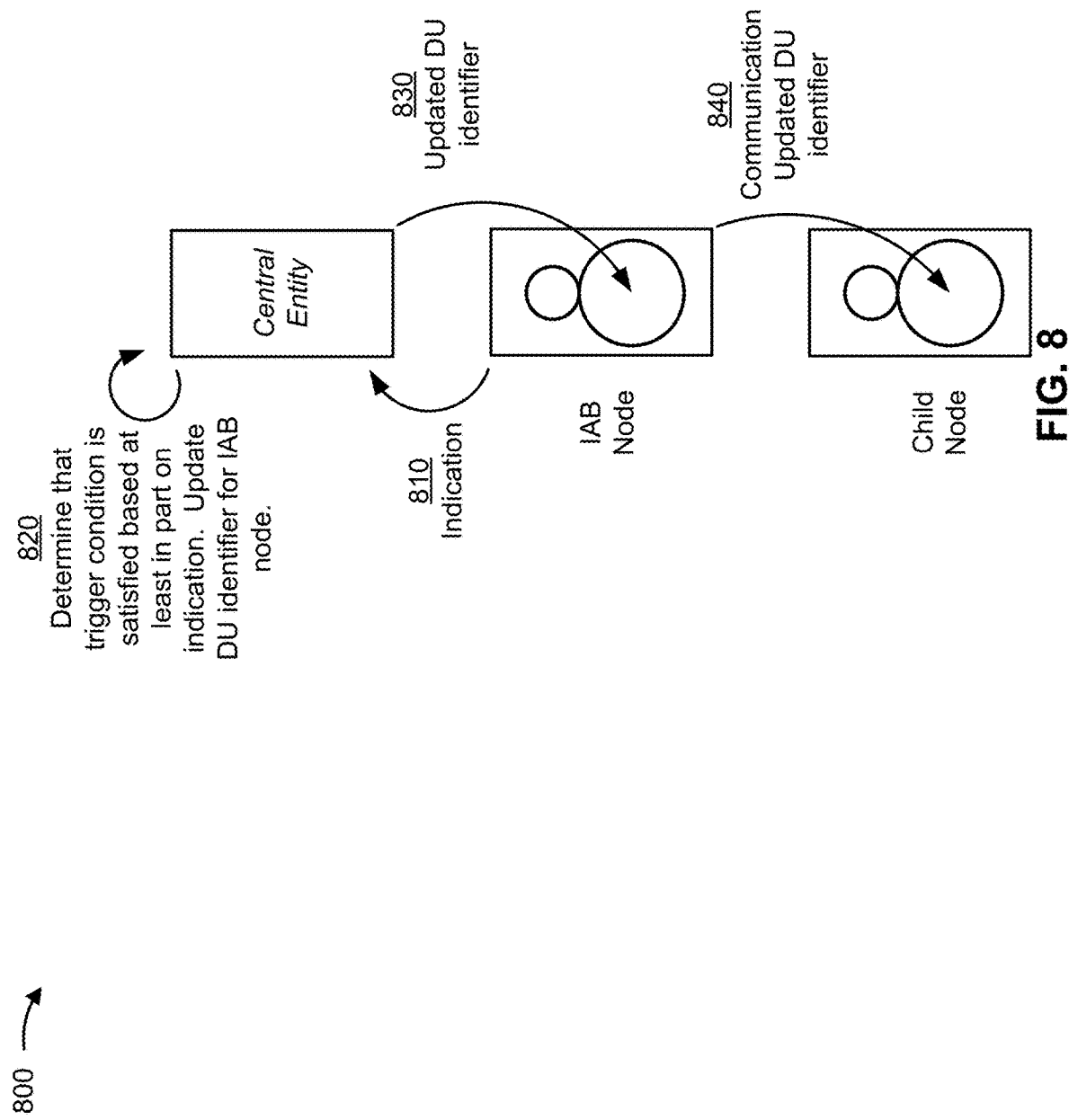

Example 800, shown in FIG. 8, is an example where a central entity updates an identifier of a DU, such as a gNB-DU ID, based at least in part on determining that a trigger condition is satisfied. In some aspects, the trigger condition may include one or more of the trigger conditions described in connection with FIG. 7, above. Additionally, or alternatively, the trigger condition may relate to establishing an F1-C association to another IAB donor CU. For example, the central entity may determine that the trigger condition is satisfied when the central entity is to establish an F1-C association between the IAB node and another central entity, and may accordingly update an identifier of the IAB node, a cell identifier associated with the IAB node, and/or the like.

As shown in FIG. 8, and by reference number 810, the IAB node may provide an indication to the central entity. Examples of the indication are described in more detail in connection with reference number 710 of FIG. 7. As shown by reference number 820, the central entity may determine that a trigger condition is satisfied. The determination of whether the trigger condition is satisfied is described in more detail in connection with reference number 720 of FIG. 7. As shown by reference number 830, the central entity may provide an updated identifier of the DU to the IAB node. For example, the central entity may provide the updated identifier using an RRC message, an F1-AP message, and/or the like. As shown by reference number 840, the IAB node may perform a communication using the updated identifier. For example, the IAB node may perform a control plane communication (e.g., with a DU of another IAB node, with the central entity, with another central entity, and/or the like) that includes the updated identifier.

Figure 9:
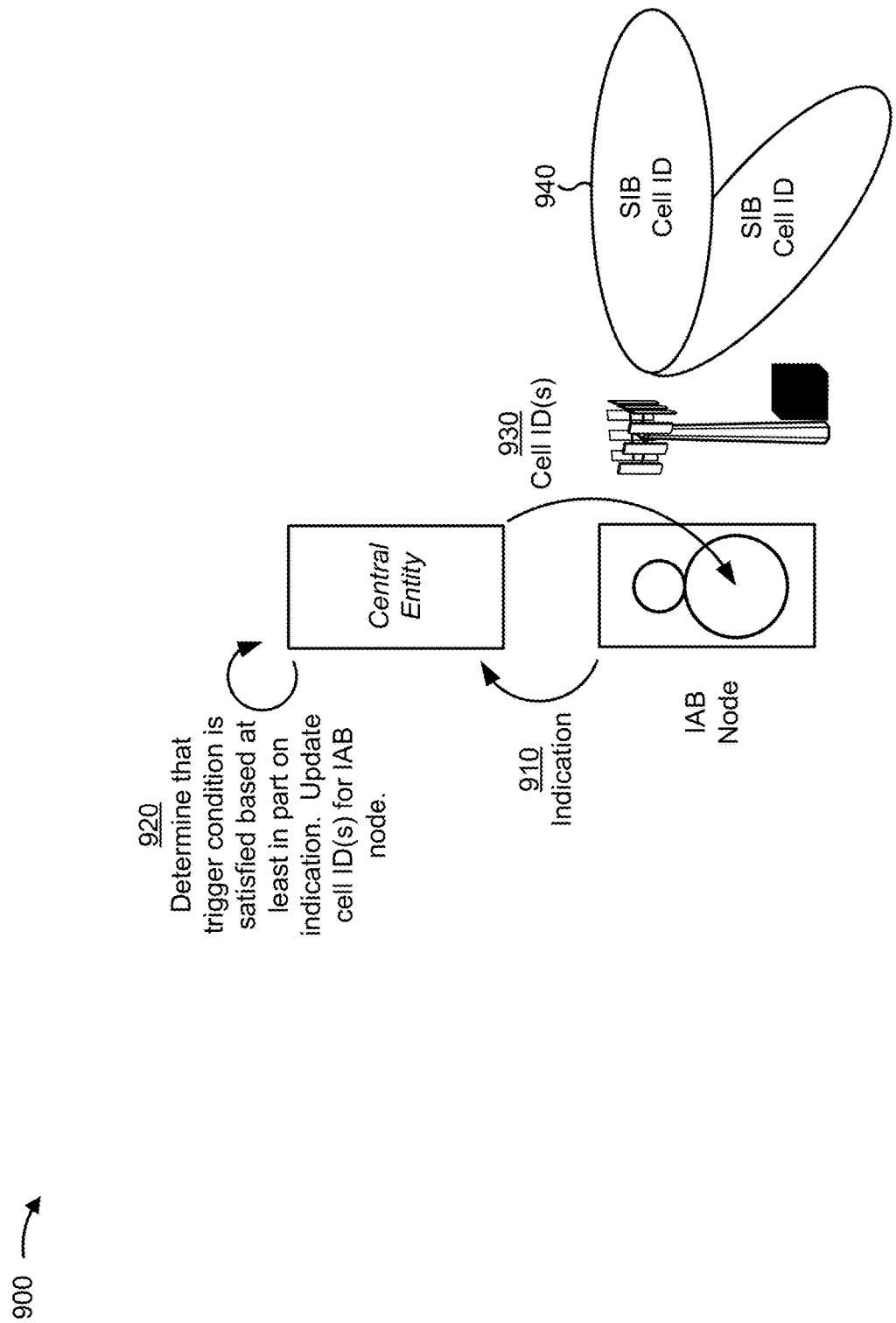

Example 900, shown in FIG. 9, is an example where a central entity updates one or more cell identifiers, such as a part of an NCGI or an entire NCGI, based at least in part on determining that a trigger condition is satisfied. As shown by reference number 910, an IAB node may provide an indication associated with a trigger condition for updating the one or more cell identifiers. Examples of the trigger condition are described in more detail in connection with FIGS. 7 and 8. As shown by reference number 920, the central entity may determine that the trigger condition is satisfied (e.g., based at least in part on the indication or independent from the indication), as described in more detail in connection with FIGS. 7 and 8. Accordingly, the central entity may determine one or more updated cell identifiers, and may provide the one or more updated cell identifiers to the IAB node, as shown by reference number 930.

A cell identifier may include information identifying a cell. For example, the cell identifier may include an NR cell global identity (NCGI). The NCGI may include a public land mobile network (PLMN) identifier and an NR cell identifier (NCI). The NCI may include a gNB identifier and a local cell identifier. The gNB identifier may be unique within a gNB (e.g., a BS 110), and may be common for all cells served by the gNB. Thus, the gNB identifier may be common for all IAB donor DUs and IAB node DUs served by an IAB donor CU-CP of a gNB.

In some aspects, the one or more cell identifiers may indicate an association with an IAB donor CU or base station. For example, if a gNB identifier or NCI that includes a gNB identifier is included in the one or more cell identifiers, then the one or more cell identifiers may indicate the association with the IAB donor CU or base station. If no gNB identifier or NCI that includes a gNB identifier is included in the one or more cell identifiers (e.g., if the one or more cell identifiers have no shared identity with cells on other DUs associated with a same central entity or base station), then the one or more cell identifiers may not indicate the association with the IAB donor CU or base station.

As shown by reference number 940, the IAB node may perform a broadcast using the one or more updated cell identifiers. For example, a base station associated with the IAB node may transmit a system information block (SIB), such as SIB1 and/or the like, that identifies at least part of the one or more updated cell identifiers. In some aspects, the IAB node's DU may include the one or more updated cell identifiers in F1-AP messages to the central entity. In some aspects, if the IAB node receives an updated NCI, gNB identifier, or local cell identifier for a cell, then the IAB node's DU may update the NCGI of the cell and include the updated NCGI in system information or F1-AP messages.

Figure 10:
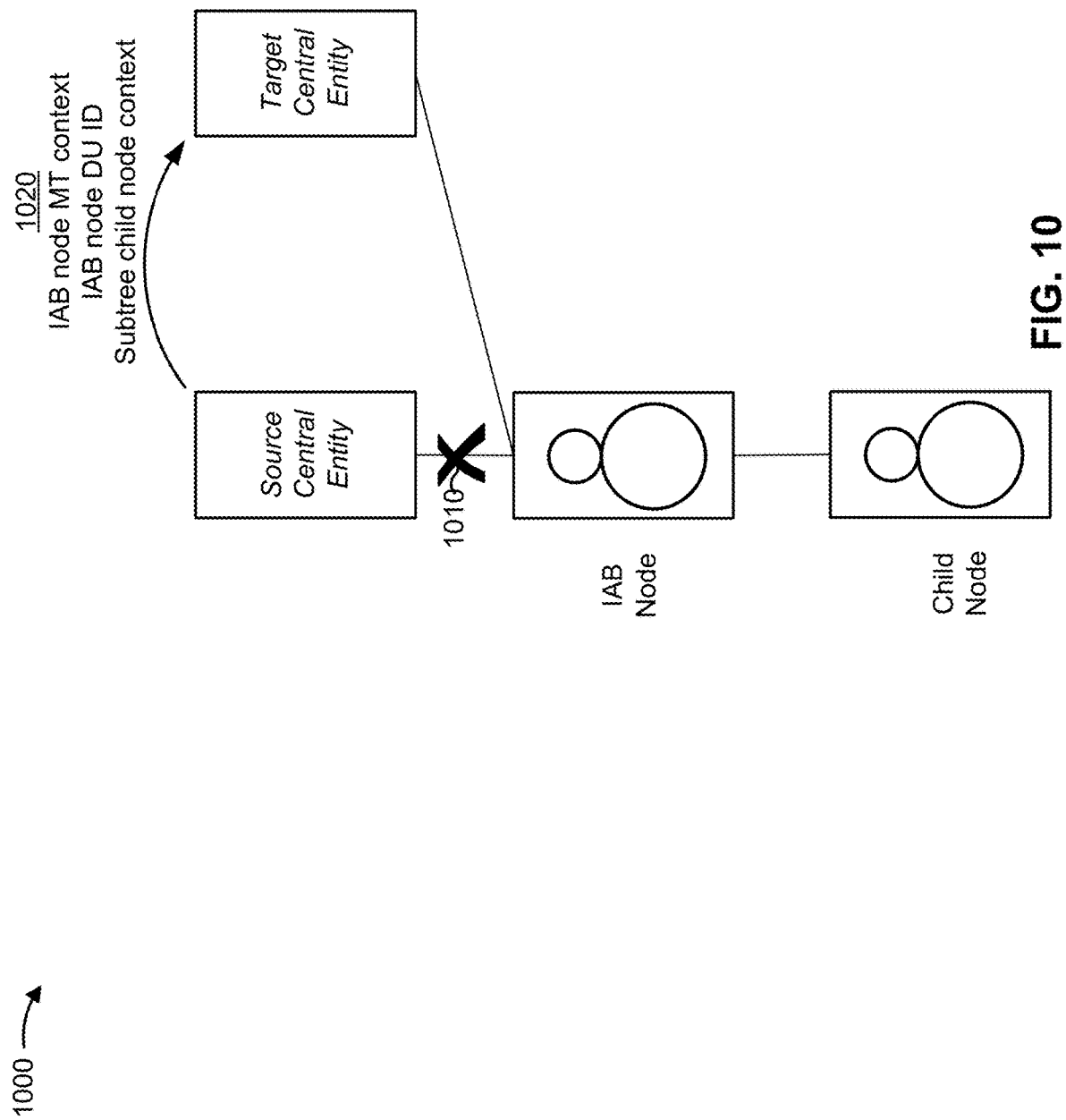

Example 1000, shown in FIG. 10, is an example where a source central entity provides one or more identifiers to a target central entity as part of a handover of one or more IAB nodes from the source central entity to the target central entity. For example, in example 1000, as shown by reference number 1010, in some aspects, one or more IAB nodes (shown as an IAB node and a child node) may be handed over from the source central entity to the target central entity. These operations may also be performed when the target central entity is associated with a secondary node (SN) that is being added for the one or more IAB nodes. In these cases, as shown by reference number 1020, information associated with the one or more IAB nodes may be transferred from the source central entity to the target central entity. For example, upon handover or SN addition for an IAB node MT, the source central entity may transfer a context of the IAB node MT, and may indicate, to the target central entity, that the MT has a collocated DU (e.g., using TNL information and/or a DU identifier of the collocated DU). In some aspects, the source central entity may indicate that the IAB node DU was previously activated. In some aspects, the source central entity may provide a list of previously served and/or activated cells at the IAB node DU (e.g., using respective cell identifiers of the previously served and/or activated cells). In some aspects, the source central entity may provide contexts for one or more served IAB nodes and/or UEs in a subtree below the IAB node (e.g., the child node shown in FIG. 10, one or more UEs not shown in FIG. 10, and/or the like). In some aspects, the target central entity may request a context regarding the IAB node (e.g., the MT of the IAB node, the DU of the IAB node, and/or the like) and/or one or more IAB nodes and/or UEs in the subtree. For example, the target central entity may request the context from the source central entity, from an AMF, and/or the like.

Figure 11:
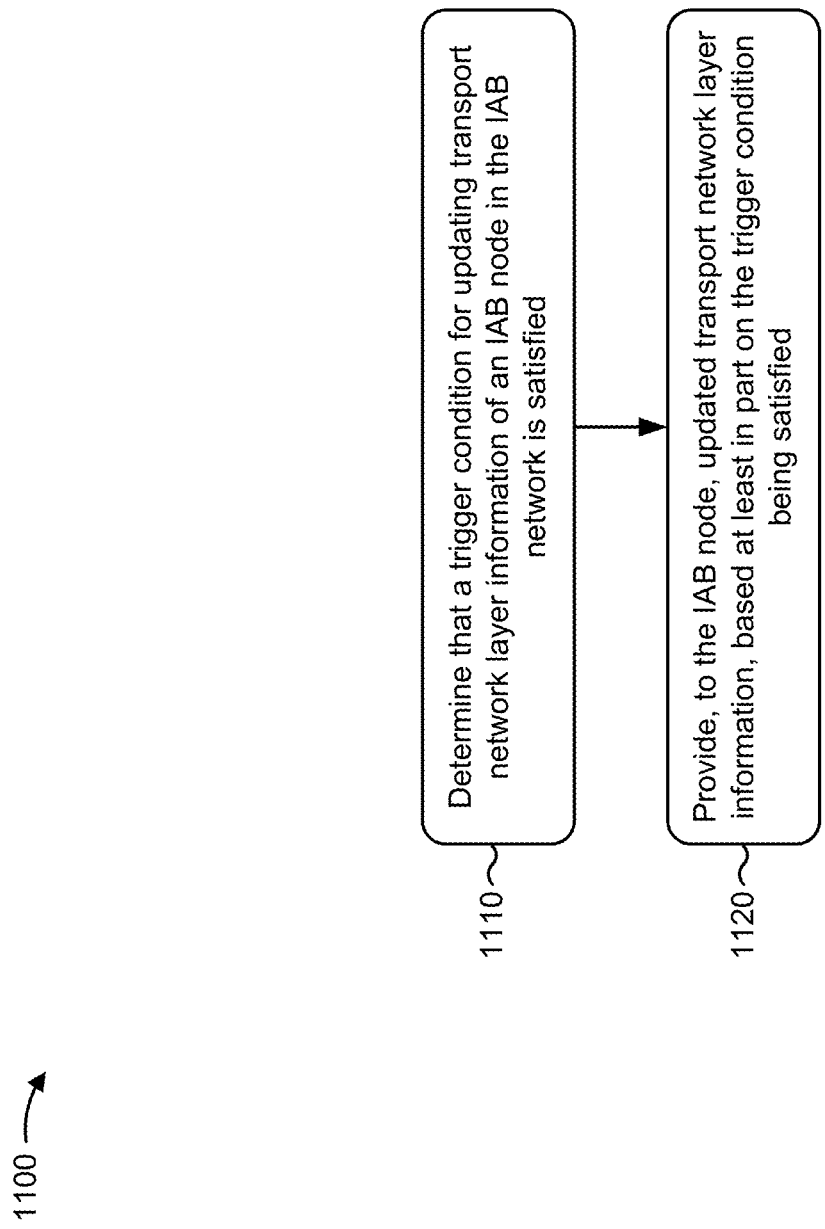
FIGS. 11-13 are diagrams illustrating example processes performed, for example, by a central entity of an IAB network, in accordance with various aspects of the present disclosure.

FIG. 11 is a diagram illustrating an example process 1100 performed, for example, by a central entity, in accordance with various aspects of the present disclosure. Example process 1100 is an example where the central entity (e.g., a CU of anchor node 405, a CU of IAB donor 505, a CU-CP, a CU-UP, a central entity of FIGS. 7-10, and/or the like) performs operations associated with management of identifiers in an IAB network.

As shown in FIG. 11, in some aspects, process 1100 may include determining that a trigger condition for updating transport network layer information of an IAB node in the IAB network is satisfied (block 1110). For example, the central entity (e.g., using antenna 234, DEMOD 232, MIMO detector 236, receive processor 238, controller/processor 240, and/or the like) may determine that a trigger condition for updating transport network layer information of an IAB node in the IAB network is satisfied. The central entity may perform this determination based at least in part on at least one of a change of a donor distributed unit associated with the IAB node, a central entity change associated with the IAB node, or an establishment, release, or modification of a route including the IAB node, as described above.

As further shown in FIG. 11, in some aspects, process 1100 may include providing, to the IAB node, updated transport network layer information, based at least in part on the trigger condition being satisfied (block 1120). For example, the central entity (e.g., using controller/processor 240, transmit processor 220, TX MIMO processor 230, MOD 232, antenna 234, and/or the like) may provide, to the IAB node, updated transport network layer information, based at least in part on the trigger condition being satisfied, as described above.

Process 1100 may include additional aspects, such as any single aspect or any combination of aspects described below and/or in connection with one or more other processes described elsewhere herein.

In a first aspect, the updated transport network layer information includes at least one of one or more Internet Protocol (IP) addresses or an IP prefix.

In a second aspect, alone or in combination with the first aspect, the updated transport network layer information is different for a signaling service than for data transport.

In a third aspect, alone or in combination with one or more of the first and second aspects, the updated transport network layer information is the same for a signaling service and for data transport.

In a fourth aspect, alone or in combination with one or more of the first through third aspects, the updated transport network layer information is different for a non-user equipment (UE)-associated service than for a UE-associated service.

In a fifth aspect, alone or in combination with one or more of the first through fourth aspects, the updated transport network layer information is the same for a non-user equipment (UE)-associated service and for a UE-associated service.

In a sixth aspect, alone or in combination with one or more of the first through fifth aspects, the change of the donor distributed unit associated with the IAB node is associated with redirecting an existing control interface association or tunnel from a route associated with a first donor distributed unit to a route associated with a second donor distributed unit.

In a seventh aspect, alone or in combination with one or more of the first through sixth aspects, the first donor distributed unit and the second donor distributed unit are associated with a same central entity.

In an eighth aspect, alone or in combination with one or more of the first through seventh aspects, the first donor distributed unit and the second donor distributed unit are associated with different control entities.

In a ninth aspect, alone or in combination with one or more of the first through eighth aspects, the updated transport network layer information is associated with the donor distributed unit.

In a tenth aspect, alone or in combination with one or more of the first through ninth aspects, the establishment, release, or modification of the route including the IAB node is based at least in part on integration of another IAB node, other than the IAB node, into the route.

In an eleventh aspect, alone or in combination with one or more of the first through tenth aspects, the establishment, release, or modification of the route including the IAB node is based at least in part on integration of the IAB node into the route.

In a twelfth aspect, alone or in combination with one or more of the first through eleventh aspects, the establishment, release, or modification of the route including the IAB node is based at least in part on radio link failure on a link associated with one of: a distributed unit of a parent node of the IAB node or an upstream node, a master cell group of the IAB node or an upstream IAB node, or a secondary cell group of the IAB node or an upstream IAB node.

In a thirteenth aspect, alone or in combination with one or more of the first through twelfth aspects, the establishment, release, or modification of the route including the IAB node is based at least in part on at least one of: a handover of a node upstream from the IAB node, a secondary node addition, an inter-master-node handover, a secondary node change, a role switch, or a master node or secondary node modification.

In a fourteenth aspect, alone or in combination with one or more of the first through thirteenth aspects, the establishment, release, or modification of the route including the IAB node is based at least in part on a topology adaptation of the route.

In a fifteenth aspect, alone or in combination with one or more of the first through fourteenth aspects, determining that the trigger condition is satisfied is based at least in part on receiving an indication from a mobile terminal of the IAB node or a different IAB node associated with the central entity.

In a sixteenth aspect, alone or in combination with one or more of the first through fifteenth aspects, determining that the trigger condition is satisfied is based at least in part on receiving an indication from a distributed unit of the IAB node or a different IAB node associated with the central entity.

In a seventeenth aspect, alone or in combination with one or more of the first through sixteenth aspects, the central entity is a first central entity, when the establishment, release, or modification of the route including the IAB node is based at least in part on a handover or a secondary node addition to a second central entity, the method further comprises: providing, to the second central entity, a context for a mobile terminal of the IAB node and an indication that the IAB node is associated with a distributed unit.

In an eighteenth aspect, alone or in combination with one or more of the first through seventeenth aspects, providing the context for the mobile terminal of the IAB node and the indication that the IAB node is associated with the distributed unit is based at least in part on receiving a request for the context and the indication that the IAB node is associated with the distributed unit from the second central entity.

In a nineteenth aspect, alone or in combination with one or more of the first through eighteenth aspects, the central entity is a first central entity, wherein the establishment, release, or modification of the route including the IAB node is based at least in part on a handover or a secondary node addition to a second central entity, and wherein the second central entity receives a context for a mobile terminal of the IAB node and an indication that the IAB node is associated with a distributed unit from a core network.

In a twentieth aspect, alone or in combination with one or more of the first through nineteenth aspects, process 1100 includes determining whether the transport network layer information is to be updated based at least in part on the trigger condition.

In a twenty-first aspect, alone or in combination with one or more of the first through twentieth aspects, the updated transport network layer information is provided using a radio resource control message or a control interface message.

In a twenty-second aspect, alone or in combination with one or more of the first through twenty-first aspects, the method includes transmitting a request for a network address; and receiving the network address, wherein the updated transport network layer information is based at least in part on the network address.

In a twenty-third aspect, alone or in combination with one or more of the first through twenty-second aspects, the method includes transmitting a configuration message indicating to release one or more network addresses.

In a twenty-fourth aspect, alone or in combination with one or more of the first through twenty-third aspects, the network address comprises at least one of an IPv4 address, an IPv6 address, or an IPv6 prefix.

In a twenty-fifth aspect, alone or in combination with one or more of the first through twenty-fourth aspects, information indicating the network address indicates a usage for the network address, and wherein the updated transport network layer information is based at least in part on the usage. The usage may indicate whether the network address is for a signaling service, data transport, or a non-UE-associated service.

In a twenty-sixth aspect, alone or in combination with one or more of the first through twenty-fifth aspects, information indicating the network address does not indicate a usage for the network address, and wherein the updated transport network layer information can be used for all traffic (e.g., a signaling service, data transport, and non-UE-associated services) based at least in part on the information indicating the network address not indicating the usage.

In a twenty-seventh aspect, alone or in combination with one or more of the first through twenty-sixth aspects, the change of the donor distributed unit is associated with radio link failure of a mobile terminal.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
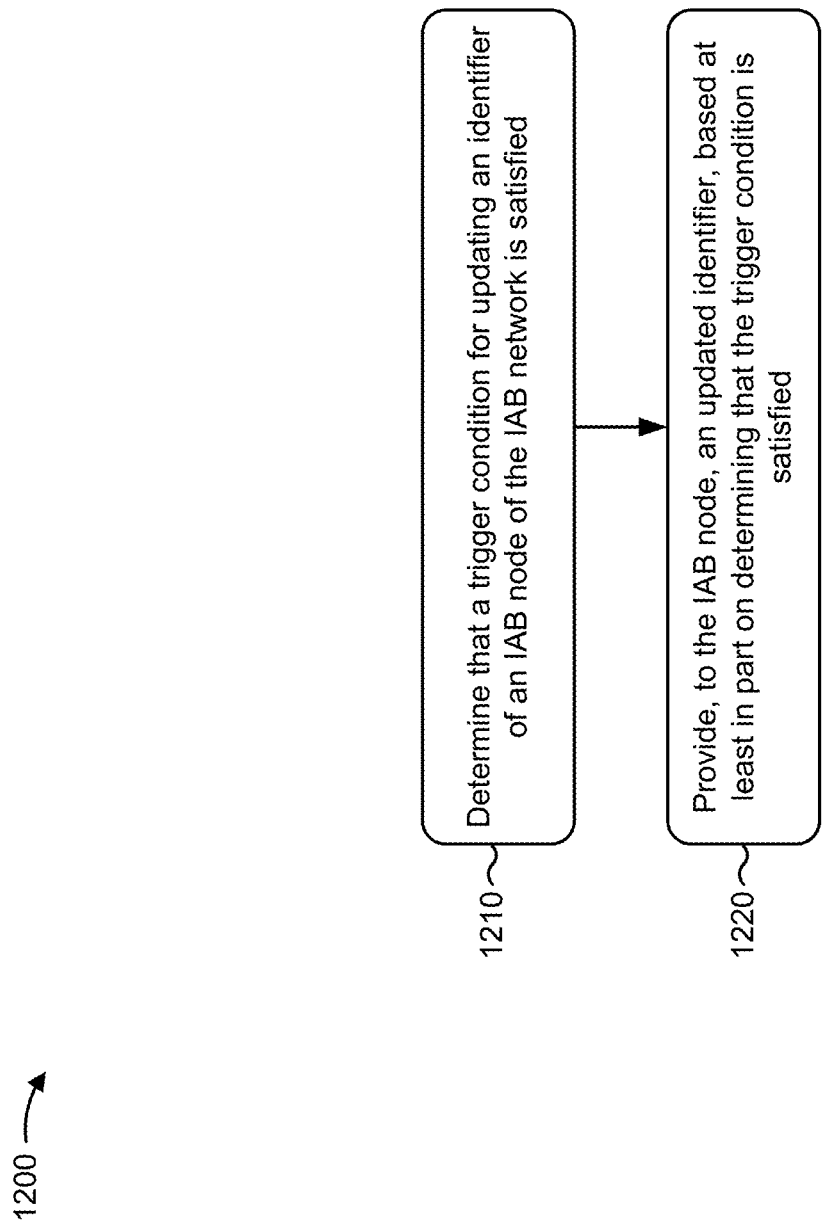

FIG. 12 is a diagram illustrating an example process 1200 performed, for example, by a central entity, in accordance with various aspects of the present disclosure. Example process 1200 is an example where the central entity (e.g., a CU anchor node 405, a CU of IAB donor 505, a CU-CP, a CU-UP, a central entity of FIGS. 7-10, and/or the like) performs operations associated with management of identifiers in an IAB network.

As shown in FIG. 12, in some aspects, process 1200 may include determining that a trigger condition for updating an identifier of an IAB node of the IAB network is satisfied (block 1210). For example, the central entity (e.g., using antenna 234, DEMOD 232, MIMO detector 236, receive processor 238, controller/processor 240, and/or the like) may determine that a trigger condition for updating an identifier of an IAB node of the IAB network is satisfied, as described above.

As further shown in FIG. 12, in some aspects, process 1200 may include providing, to the IAB node, an updated identifier, based at least in part on determining that the trigger condition is satisfied (block 1220). For example, the central entity (e.g., using controller/processor 240, transmit processor 220, TX MIMO processor 230, MOD 232, antenna 234, and/or the like) may provide, to the IAB node, an updated identifier, based at least in part on determining that the trigger condition is satisfied, as described above.

Process 1200 may include additional aspects, such as any single aspect or any combination of aspects described below and/or in connection with one or more other processes described elsewhere herein.

In a first aspect, determining that the trigger condition is satisfied is based at least in part on establishment, release, or modification of a route including the IAB node.

In a second aspect, alone or in combination with the first aspect, the identifier of the IAB node includes a distributed unit identifier for control interface procedures.

In a third aspect, alone or in combination with one or more of the first and second aspects, the trigger condition is associated with establishing a control plane association between the IAB node and a target central entity.

In a fourth aspect, alone or in combination with one or more of the first through third aspects, determining that the trigger condition is satisfied is based at least in part on receiving an indication from a mobile terminal of the IAB node or a different IAB node associated with the central entity.

In a fifth aspect, alone or in combination with one or more of the first through fourth aspects, determining that the trigger condition is satisfied is based at least in part on receiving an indication from a distributed unit of the IAB node or a different IAB node associated with the central entity.

In a sixth aspect, alone or in combination with one or more of the first through fifth aspects, the central entity is a first central entity, and when the trigger condition is based at least in part on a handover or a secondary node addition to a second central entity, the method further comprises: providing, to the second central entity, a context for a mobile terminal of the IAB node and an indication that the IAB node is associated with a distributed unit.

In a seventh aspect, alone or in combination with one or more of the first through sixth aspects, process 1200 includes determining whether the identifier of the IAB node is to be updated based at least in part on the trigger condition.

In an eighth aspect, alone or in combination with one or more of the first through seventh aspects, the updated identifier is provided using a radio resource control message or a control interface message.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
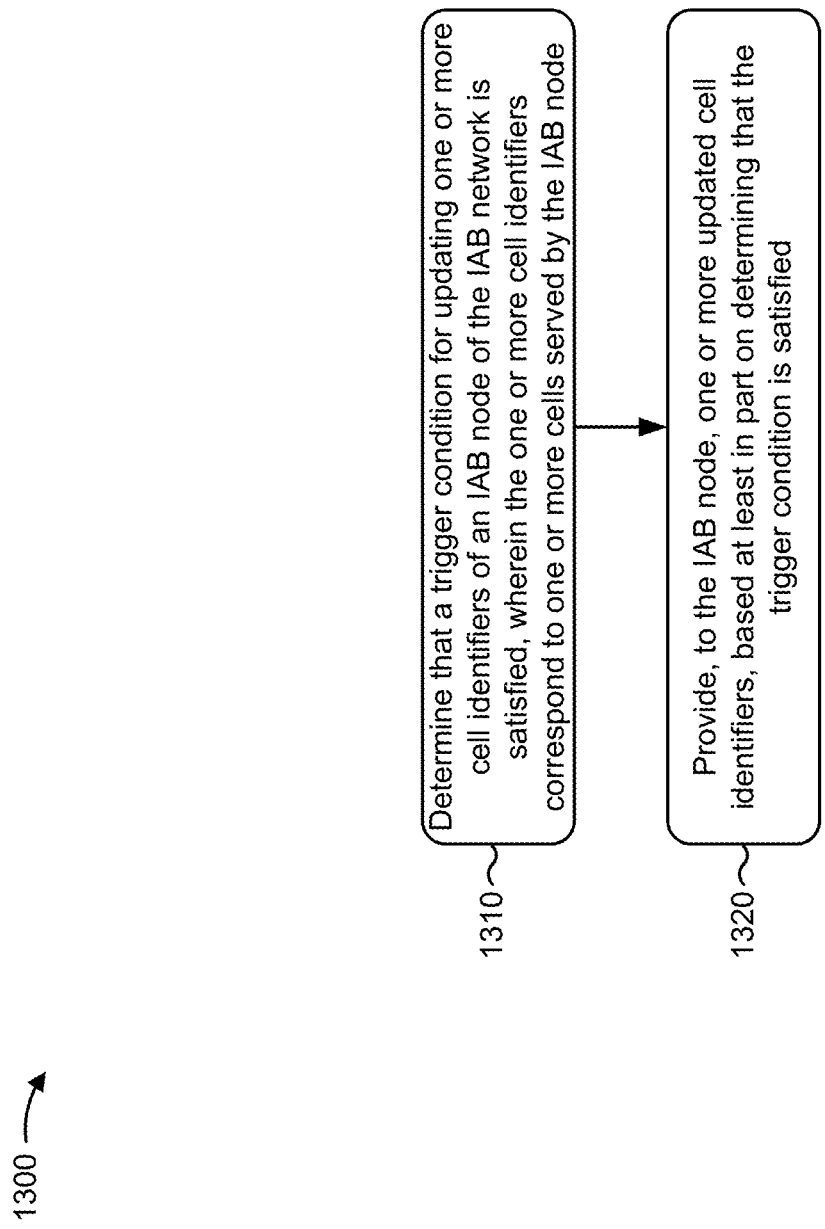

FIG. 13 is a diagram illustrating an example process 1300 performed, for example, by a central entity, in accordance with various aspects of the present disclosure. Example process 1300 is an example where the central entity (e.g., a CU anchor node 405, a CU of IAB donor 505, a CU-CP, a CU-UP, a central entity of FIGS. 7-10, and/or the like) performs operations associated with management of identifiers in an IAB network.

As shown in FIG. 13, in some aspects, process 1300 may include determining that a trigger condition for updating one or more cell identifiers of an IAB node of the IAB network is satisfied, wherein the one or more updated cell identifiers correspond to one or more cells served by the IAB node (block 1310). For example, the central entity (e.g., using antenna 234, DEMOD 232, MIMO detector 236, receive processor 238, controller/processor 240, and/or the like) may determine that a trigger condition for updating one or more cell identifiers of an IAB node of the IAB network is satisfied, as described above. In some aspects, the one or more cell identifiers correspond to one or more cells served by the IAB node. As used herein, a cell served by the IAB node may refer to a cell for which the IAB node provides a backhaul to an IAB donor and/or a core network.

As further shown in FIG. 13, in some aspects, process 1300 may include providing, to the IAB node, one or more updated cell identifiers, based at least in part on determining that the trigger condition is satisfied (block 1320). For example, the central entity (e.g., using controller/processor 240, transmit processor 220, TX MIMO processor 230, MOD 232, antenna 234, and/or the like) may provide, to the IAB node, one or more updated cell identifiers, based at least in part on determining that the trigger condition is satisfied, as described above.

Process 1300 may include additional aspects, such as any single aspect or any combination of aspects described below and/or in connection with one or more other processes described elsewhere herein.

In a first aspect, determining that the trigger condition is satisfied is based at least in part on establishment, release, or modification of a route including the IAB node.

In a second aspect, alone or in combination with the first aspect, the one or more cell identifiers include at least one of a New Radio cell global identifier, a public land mobile network identifier, a base station identifier, a local cell identifier, or a New Radio cell identifier.

In a third aspect, alone or in combination with one or more of the first and second aspects, the trigger condition is associated with establishing a control plane association between the IAB node and a target central entity.

In a fourth aspect, alone or in combination with one or more of the first through third aspects, determining that the trigger condition is satisfied is based at least in part on receiving an indication from a mobile terminal of the IAB node or a different IAB node associated with the central entity.

In a fifth aspect, alone or in combination with one or more of the first through fourth aspects, determining that the trigger condition is satisfied is based at least in part on receiving an indication from a distributed unit of the IAB node or a different IAB node associated with the central entity.

In a sixth aspect, alone or in combination with one or more of the first through fifth aspects, the central entity is a first central entity, and when the trigger condition is based at least in part on a handover or a secondary node addition to a second central entity, the method further comprises: providing, to the second central entity, a context for a mobile terminal of the IAB node and an indication that the IAB node is associated with a distributed unit.

In a seventh aspect, alone or in combination with one or more of the first through sixth aspects, process 1300 includes determining whether the one or more cell identifiers are to be updated based at least in part on the trigger condition.

In an eighth aspect, alone or in combination with one or more of the first through seventh aspects, the one or more updated cell identifiers are provided using a radio resource control message or a control interface message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
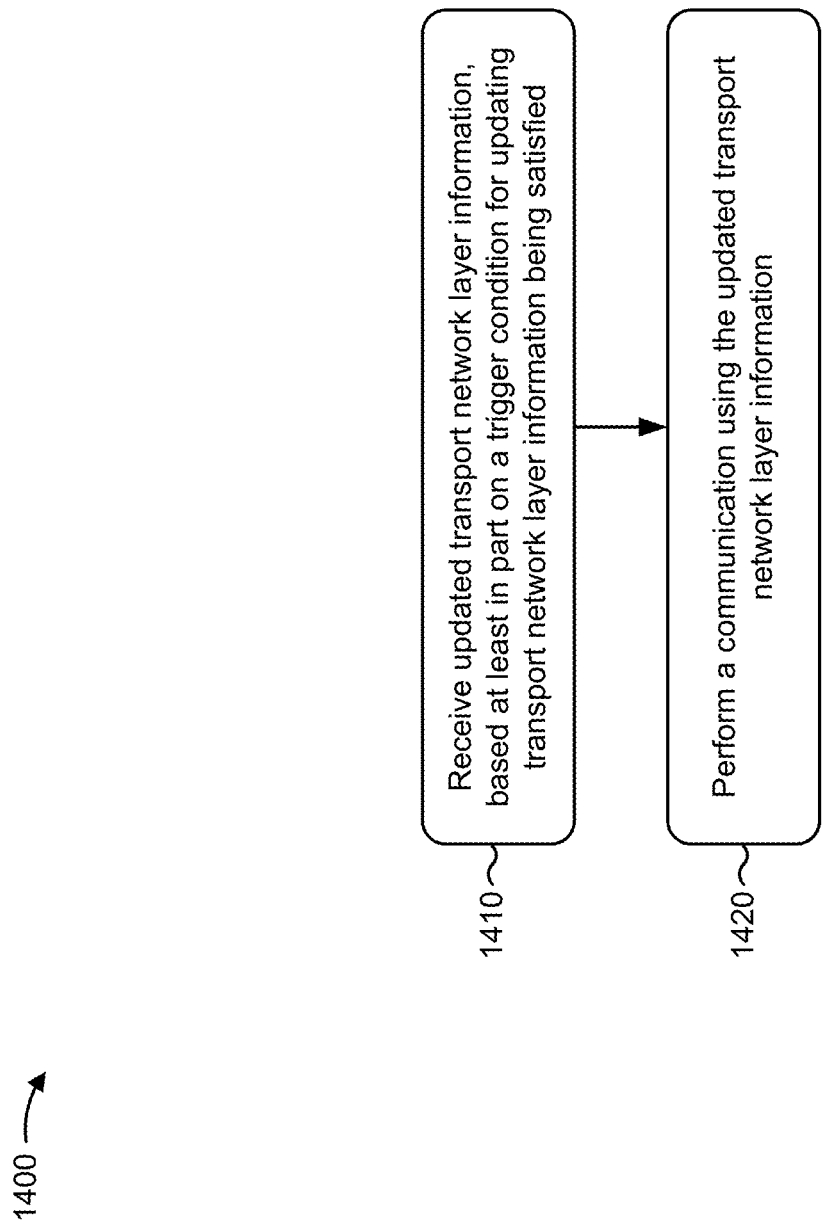
FIGS. 14-16 are diagrams illustrating example processes performed, for example, by an IAB node of an IAB network, in accordance with various aspects of the present disclosure.

FIG. 14 is a diagram illustrating an example process 1400 performed, for example, by an IAB node, in accordance with various aspects of the present disclosure. Example process 1400 is an example where the IAB node (e.g., BS 110, non-anchor base station 345, non-anchor node 410, DU function 420, MT function 415, IAB node 510, the IAB node shown in FIGS. 7-10, the child node shown in FIGS. 7-10, and/or the like) performs operations associated with management of identifiers in an IAB network.

As shown in FIG. 14, in some aspects, process 1400 may include receiving updated transport network layer information, based at least in part on a trigger condition for updating transport network layer information being satisfied (block 1410). For example, the IAB node (e.g., using antenna 234, DEMOD 232, MIMO detector 236, receive processor 238, controller/processor 240, and/or the like) may receive updated transport network layer information, based at least in part on a trigger condition for updating transport network layer information being satisfied, as described above. In some aspects, the trigger condition is based at least in part on at least one of a change of a donor distributed unit associated with the IAB node, a central entity change associated with the IAB node, or an establishment, release, or modification of a route including the IAB node.

As further shown in FIG. 14, in some aspects, process 1400 may include performing a communication using the updated transport network layer information (block 1420). For example, the IAB node (e.g., using controller/processor 240, transmit processor 220, TX MIMO processor 230, MOD 232, antenna 234, and/or the like) may perform a communication using the updated transport network layer information, as described above.

Process 1400 may include additional aspects, such as any single aspect or any combination of aspects described below and/or in connection with one or more other processes described elsewhere herein.

In a first aspect, process 1400 includes receiving a request for a network address; and providing the network address, wherein the updated transport network layer information is being based at least in part on the network address.

In a second aspect, alone or in combination with the first aspect, process 1400 includes receiving a configuration message indicating to release one or more network addresses; and releasing the one or more network addresses based at least in part on the configuration message.

In a third aspect, alone or in combination with one or more of the first and second aspects, the network address comprises at least one of an IPv4 address, an IPv6 address, or an IPv6 prefix.

In a fourth aspect, alone or in combination with one or more of the first through third aspects, information indicating the network address indicates a usage for the network address, and the updated transport network layer information is based at least in part on the usage.

In a fifth aspect, alone or in combination with one or more of the first through fourth aspects, information indicating the network address does not indicate a usage for the network address, and wherein the updated transport network layer information can be used for all traffic based at least in part on the information indicating the network address not indicating the usage.

In a sixth aspect, alone or in combination with one or more of the first through fifth aspects, the change of the donor distributed unit is associated with radio link failure of a mobile terminal.

In a seventh aspect, alone or in combination with one or more of the first through sixth aspects, process 1400 includes providing, to a central entity, an indication regarding the establishment, release, or modification of the route, wherein the trigger condition is being based at least in part on the indication.

In an eighth aspect, alone or in combination with one or more of the first through seventh aspects, the IAB node comprises a mobile terminal.

In a ninth aspect, alone or in combination with one or more of the first through eighth aspects, the IAB node comprises a distributed unit.

In a tenth aspect, alone or in combination with one or more of the first through ninth aspects, the IAB node is an IAB donor.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
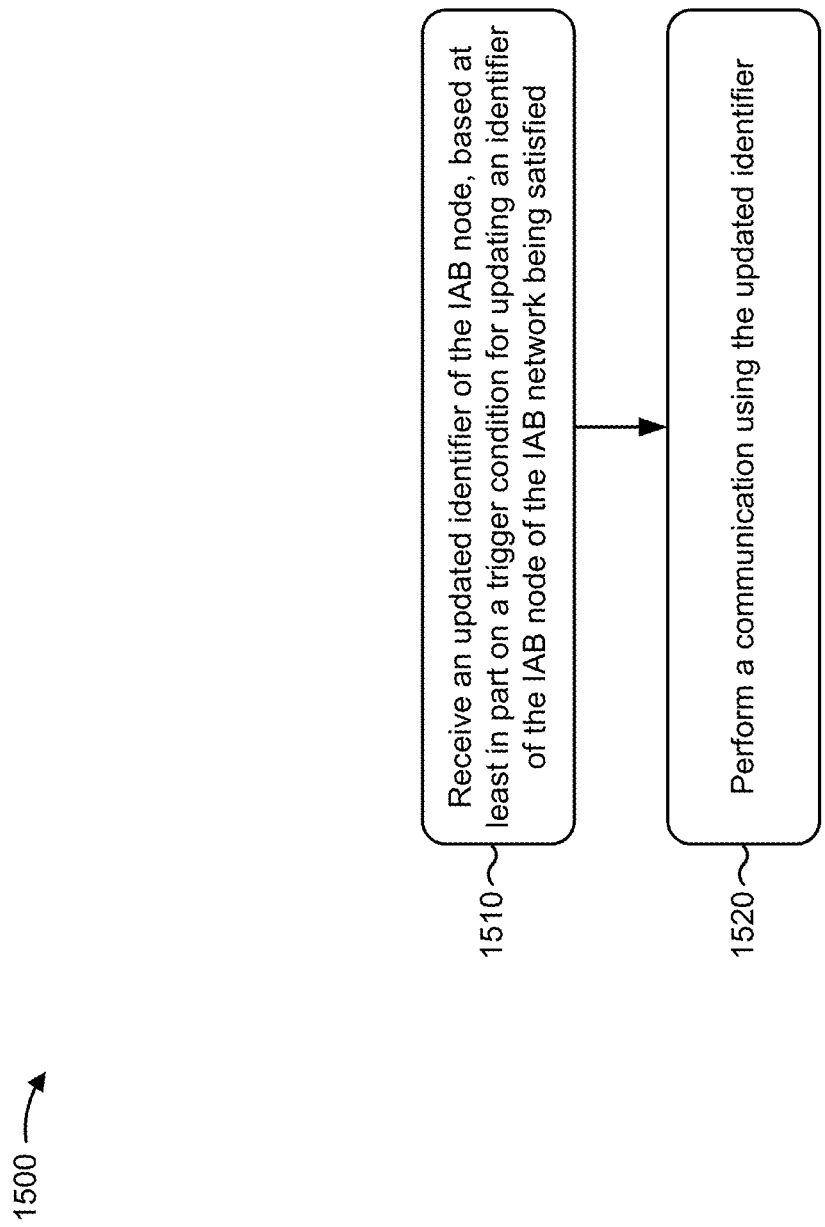

FIG. 15 is a diagram illustrating an example process 1500 performed, for example, by an IAB node, in accordance with various aspects of the present disclosure. Example process 1500 is an example where the IAB node (e.g., BS 110, non-anchor base station 345, non-anchor node 410, DU function 420, MT function 415, IAB node 510, the IAB node shown in FIGS. 7-10, the child node shown in FIGS. 7-10, and/or the like) performs operations associated with management of identifiers in an IAB network.

As shown in FIG. 15, in some aspects, process 1500 may include receiving an updated identifier of the IAB node, based at least in part on a trigger condition for updating an identifier of the IAB node of the IAB network being satisfied (block 1510). For example, the IAB node (e.g., using antenna 234, DEMOD 232, MIMO detector 236, receive processor 238, controller/processor 240, and/or the like) may receive an updated identifier of the IAB node, based at least in part on a trigger condition for updating an identifier of the IAB node of the IAB network being satisfied, as described above.

As further shown in FIG. 15, in some aspects, process 1500 may include performing a communication using the updated identifier (block 1520). For example, the IAB node (e.g., using controller/processor 240, transmit processor 220, TX MIMO processor 230, MOD 232, antenna 234, and/or the like) may perform a communication using the updated identifier, as described above.

Process 1500 may include additional aspects, such as any single aspect or any combination of aspects described below and/or in connection with one or more other processes described elsewhere herein.

In a first aspect, the identifier of the IAB node includes a distributed unit identifier for control interface procedures.

In a second aspect, alone or in combination with the first aspect, process 1500 includes providing, to a central entity, an indication regarding an establishment, release, or modification of a route including the IAB node, wherein the trigger condition is being based at least in part on the indication.

In a third aspect, alone or in combination with one or more of the first and second aspects, the IAB node comprises a mobile terminal.

In a fourth aspect, alone or in combination with one or more of the first through third aspects, the IAB node comprises a distributed unit.

In a fifth aspect, alone or in combination with one or more of the first through fourth aspects, the IAB node is an IAB donor.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
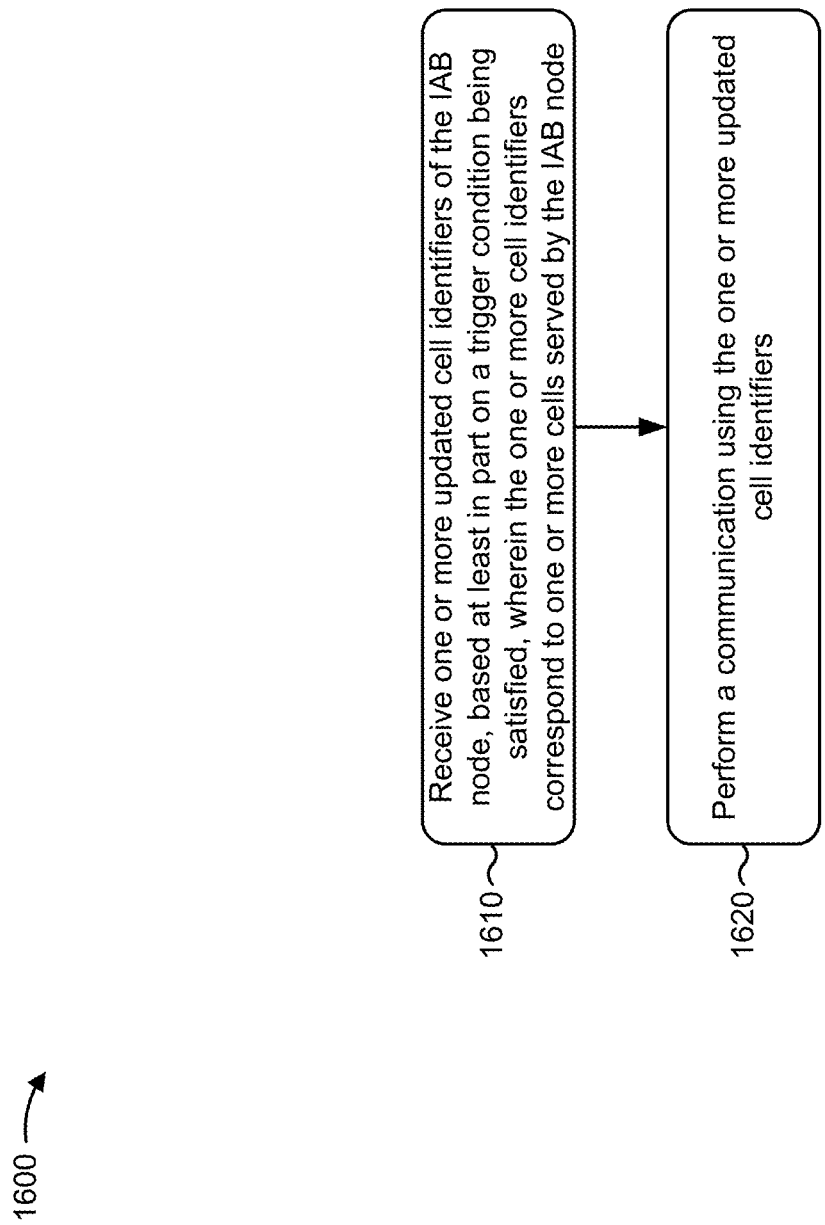

FIG. 16 is a diagram illustrating an example process 1600 performed, for example, by an IAB node, in accordance with various aspects of the present disclosure. Example process 1600 is an example where the IAB node (e.g., BS 110, non-anchor base station 345, non-anchor node 410, DU function 420, MT function 415, IAB node 510, the IAB node shown in FIGS. 7-10, the child node shown in FIGS. 7-10, and/or the like) performs operations associated with management of identifiers in an IAB network.

As shown in FIG. 16, in some aspects, process 1600 may include receiving one or more updated cell identifiers of the IAB node, based at least in part on a trigger condition being satisfied, wherein the one or more updated cell identifiers correspond to one or more cells served by the IAB node (block 1610). For example, the IAB node (e.g., using antenna 234, DEMOD 232, MIMO detector 236, receive processor 238, controller/processor 240, and/or the like) may receive one or more updated cell identifiers of the IAB node, based at least in part on a trigger condition being satisfied, as described above. In some aspects, the one or more cell identifiers correspond to one or more cells served by the IAB node.

As further shown in FIG. 16, in some aspects, process 1600 may include performing a communication using the one or more updated cell identifiers (block 1620). For example, the IAB node (e.g., using controller/processor 240, transmit processor 220, TX MIMO processor 230, MOD 232, antenna 234, and/or the like) may perform a communication using the one or more updated cell identifiers, as described above.

Process 1600 may include additional aspects, such as any single aspect or any combination of aspects described below and/or in connection with one or more other processes described elsewhere herein.

In a first aspect, process 1600 includes providing, to a central entity, an indication regarding an establishment, release, or modification of a route including the IAB node, wherein the trigger condition is being based at least in part on the indication.

In a second aspect, alone or in combination with the first aspect, the communication comprises one or more system information blocks (SIBS) broadcasted including the one or more updated cell identifiers or one or more control interface messages including the one or more updated cell identifiers.

In a third aspect, alone or in combination with one or more of the first and second aspects, the IAB node comprises a mobile terminal.

In a fourth aspect, alone or in combination with one or more of the first through third aspects, the IAB node comprises a distributed unit.

In a fifth aspect, alone or in combination with one or more of the first through fourth aspects, the IAB node is an IAB donor.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A central entity in an integrated access and backhaul (IAB) network, comprising:
   one or more memories; and
   one or more processors coupled to the one or more memories, the one or more processors configured to:
      determine that a trigger condition, for updating transport network layer information of an IAB node in the IAB network, is satisfied based at least in part on a change of a first donor distributed unit, associated with the IAB node, to a second donor distributed unit in the IAB network; and
      provide, to the IAB node and based at least in part on the trigger condition being satisfied, updated transport network layer information, identifying at least one of an Internet Protocol version 4 (IPv4) address or an Internet Protocol version 6 (IPv6) address, that is different for a signaling service than for a data transport and that is different for a non-user equipment (UE)-associated service than for a UE-associated service.

2. The central entity of claim 1, wherein the updated transport network layer information further identifies an Internet Protocol (IP) prefix associated with the at least one of the IPv4 address or the IPv6 address.

3. The central entity of claim 1, wherein the change of the first donor distributed unit to the second donor distributed unit comprises redirecting an existing control interface association or tunnel from a route associated with the first donor distributed unit to a route associated with the second donor distributed unit.

4. The central entity of claim 3, wherein the first donor distributed unit is associated with a first central unit and the second donor distributed unit are associated with a second central unit.

5. The central entity of claim 1, wherein the updated transport network layer information is associated with the second donor distributed unit.

6. The central entity of claim 1, wherein the one or more processors, to determine that the trigger condition is satisfied, are configured to determine that the trigger condition is satisfied further based at least in part on receiving an indication from a mobile terminal of the IAB node or a different IAB node associated with the central entity.

7. The central entity of claim 1, wherein the one or more processors, to determine that the trigger condition is satisfied, are configured to determine that the trigger condition is satisfied further based at least in part on receiving an indication from a distributed unit of the IAB node or a different IAB node associated with the central entity.

8. The central entity of claim 1, wherein the updated transport network layer information is provided using a radio resource control message.

9. The central entity of claim 1, wherein the one or more processors are further configured to:
   transmit a request for a network address; and
   receive, based at least in part on transmitting the request, information associated with the at least one of the IPv4 address or the IPv6 address,
      wherein the updated transport network layer information is provided based at least in part on receiving the information associated with the at least one of the IPv4 address or the IPv6 address.

10. The central entity of claim 9, wherein the one or more processors are further configured to:
    transmit, based at least in part on receiving the information associated with the at least one of the IPv4 address or the IPv6 address, a configuration message indicating to release the at least one of the IPv4 address or the IPv6 address.

11. The central entity of claim 9, wherein the information associated with the at least one of the IPv4 address or the IPv6 address indicates a usage for the at least one of the IPv4 address or the IPv6 address, and wherein the updated transport network layer information is based at least in part on the usage.

12. The central entity of claim 9, wherein the information associated with the at least one of the IPv4 address or the IPv6 address does not indicate a usage for the at least one of the IPv4 address or the IPv6 address, and wherein the updated transport network layer information is used for all traffic based at least in part on the information associated with the at least one of the IPv4 address or the IPv6 address not indicating the usage.

13. The central entity of claim 1, wherein the change of the first donor distributed unit to the second donor distributed unit is associated with radio link failure of a mobile terminal.

14. The central entity of claim 1, wherein the first donor distributed unit and the second donor distributed unit are associated with a same central unit.

15. The central entity of claim 1, wherein the signaling service comprises F1-C traffic and the data transport comprises F1-U traffic.

16. The central entity of claim 1, wherein the trigger condition is determined to be satisfied further based at least in part on receiving an indication from a distributed unit of the IAB node or a different IAB node associated with the central entity.

17. An integrated access and backhaul (IAB) node in an IAB network, comprising:
one or more memories; and
one or more processors coupled to the one or more memories, the one or more processors configured to:
receive updated transport network layer information, identifying at least one of an Internet Protocol version 4 (IPv4) address or an Internet Protocol version 6 (IPv6) address, that is different for a signaling service than for data transport and that is different for a non-user equipment (UE)-associated service than for a UE-associated service,
wherein the updated transport network layer information is based at least in part on a trigger condition for updating transport network layer information being satisfied,
wherein the trigger condition is based at least in part on a change of a first donor distributed unit, associated with the IAB node, to a second donor distributed unit in the IAB network; and
perform a communication using the updated transport network layer information.

18. The IAB node of claim 17, wherein the one or more processors are further configured to:
receive a request for a network address; and
provide, based at least in part on receiving the request, information associated with the at least one of the IPv4 address or the IPv6 address,
wherein the updated transport network layer information is received based at least in part on providing the at least one of the IPv4 address or the IPv6 address.

19. The IAB node of claim 18, wherein the one or more processors are further configured to:
receive, based at least in part on providing the information associated with the at least one of the IPv4 address or the IPv6 address, a configuration message indicating to release the at least one of the IPv4 address or the IPv6 address; and
release the at least one of the IPv4 address or the IPv6 address based at least in part on the configuration message.

20. The IAB node of claim 18, wherein the information associated with the at least one of the IPv4 address or the IPv6 address indicates a usage for the at least one of the IPv4 address or the IPv6 address, and wherein the updated transport network layer information is based at least in part on the usage.

21. The IAB node of claim 18, wherein the information associated with the network address does not indicate a usage for the at least one of the IPv4 address or the IPv6 address, and wherein the updated transport network layer information is based at least in part on the information associated with the at least one of the IPv4 address or the IPv6 address not indicating the usage.

22. The IAB node of claim 17, wherein the change of the first donor distributed unit to the second donor distributed unit is associated with radio link failure of a mobile terminal.

23. A method of wireless communication performed by a central entity in an integrated access and backhaul (TAB) network, comprising:
determining that a trigger condition, for updating transport network layer information of an IAB node in the TAB network, is satisfied based at least in part on a change of a first donor distributed unit, associated with the IAB node, to a second donor distributed unit in the IAB network, wherein the first donor distributed unit is associated with a different central entity than the second donor distributed unit; and
providing, to the IAB node and based at least in part on the trigger condition being satisfied, updated transport network layer information, identifying at least one of an Internet Protocol version 4 (IPv4) address or an Internet Protocol version 6 (IPv6) address, that is different for signaling services than for data transport and that is different for a non-user equipment (UE)-associated service than for a UE-associated service.

24. The method of claim 23, wherein the change of the first donor distributed unit to the second donor distributed unit comprises redirecting an existing control interface association or tunnel from a route associated with the first donor distributed unit to a route associated with the second donor distributed unit.

25. The method of claim 24, wherein the first donor distributed unit is associated with a first central unit and the second donor distributed unit are associated with a second central unit.

26. The method of claim 23, wherein the updated transport network layer information further includes an Internet Protocol (IP) prefix associated with the at least one of the IPv4 address or the IPv6 address.

27. The method of claim 23, wherein the first donor distributed unit and the second donor distributed unit are associated with a same central unit.

28. The method of claim 23, wherein the updated transport network layer information is provided using a radio resource control message.

29. The method of claim 23, wherein determining that the trigger condition is satisfied is further based at least in part on receiving an indication from a mobile terminal of the IAB node or a different IAB node associated with the central entity.

30. A method of wireless communication performed by an integrated access and backhaul (IAB) node in an TAB network, comprising:
receiving updated transport network layer information, identifying at least one of an Internet Protocol version 4 (IPv4) address or an Internet Protocol version 6 (IPv6) address, that is different for a signaling service than for data transport and that is different for a non-user equipment (UE)-associated service than for a UE-associated service,
wherein the updated transport network layer information is based at least in part on a trigger condition for updating transport network layer information being satisfied,
wherein the trigger condition is based at least in part on a change of a first donor distributed unit, associated with the IAB node, to a second donor distributed unit in the IAB network; and
performing a communication using the updated transport network layer information.

* * * * *